US010501318B2

United States Patent
Fan et al.

(10) Patent No.: US 10,501,318 B2
(45) Date of Patent: Dec. 10, 2019

(54) METHODS FOR FUEL CONVERSION

(71) Applicant: OHIO STATE INNOVATION FOUNDATION, Columbus, OH (US)

(72) Inventors: Liang-Shih Fan, Columbus, OH (US); Siwei Luo, Columbus, OH (US); Liang Zeng, Columbus, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 16/166,746

(22) Filed: Oct. 22, 2018

(65) Prior Publication Data

US 2019/0055123 A1 Feb. 21, 2019

Related U.S. Application Data

(63) Continuation of application No. 14/766,086, filed as application No. PCT/US2014/014877 on Feb. 5, 2014, now Pat. No. 10,144,640.

(Continued)

(51) Int. Cl.
*C01B 3/34* (2006.01)
*C10J 3/57* (2006.01)
*B01J 8/12* (2006.01)

(52) U.S. Cl.
CPC ............... *C01B 3/344* (2013.01); *B01J 8/12* (2013.01); *C10J 3/57* (2013.01); *C01B 2203/02* (2013.01);
(Continued)

(58) Field of Classification Search
CPC .................................................. C01B 3/344
See application file for complete search history.

(56) References Cited

U.S. PATENT DOCUMENTS 971,206 A 9/1910 Messerschmitt
1,078,686 A 11/1913 Lane
(Continued)

FOREIGN PATENT DOCUMENTS

CN 1329761 1/2001
CN 1454711 11/2003
(Continued)

OTHER PUBLICATIONS

United States Patent Office Notice of Allowance for U.S. Appl. No. 15/376,590 dated Jan. 9, 2019 (6 pages).
(Continued)

*Primary Examiner* — Douglas B Call
(74) *Attorney, Agent, or Firm* — Michael Best & Friedrich LLP

(57) ABSTRACT

In one embodiment described herein, fuel may be converted into syngas by a method comprising feeding the fuel and composite metal oxides into a reduction reactor in a co-current flow pattern relative to one another, reducing the composite metal oxides with the fuel to form syngas and reduced composite metal oxides, transporting the reduced composite metal oxides to an oxidation reactor, regenerating the composite metal oxides by oxidizing the reduced composite metal oxides with an oxidizing reactant in the oxidation reactor, and recycling the regenerated composite metal oxides to the reduction reactor for subsequent reduction reactions to produce syngas. The composite metal oxides may be solid particles comprising a primary metal oxide and a secondary metal oxide.

10 Claims, 15 Drawing Sheets

Related U.S. Application Data

(60) Provisional application No. 61/779,243, filed on Mar. 13, 2013, provisional application No. 61/761,016, filed on Feb. 5, 2013.

(52) U.S. Cl.
CPC .......... C01B 2203/0255 (2013.01); C01B 2203/1241 (2013.01); C10J 2300/093 (2013.01); C10J 2300/0916 (2013.01); C10J 2300/0953 (2013.01); C10J 2300/1807 (2013.01); Y02E 60/324 (2013.01); Y02P 20/134 (2015.11)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 2,979,384 A | 4/1961 | Weiner et al. |
| 3,027,238 A | 3/1962 | Watkins |
| 3,031,287 A | 4/1962 | Benson et al. |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A | 5/1969 | Huebler et al. |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 3,962,409 A | 6/1976 | Kotera et al. |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,155,832 A | 5/1979 | Cox et al. |
| 4,272,399 A | 6/1981 | Davis et al. |
| 4,318,711 A | 3/1982 | Smith |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,439,412 A | 3/1984 | Behie et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,902,586 A | 2/1990 | Wertheim |
| 4,895,821 A | 6/1990 | Kainer et al. |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 6,007,699 A | 12/1999 | Cole |
| 6,143,203 A | 11/2000 | Zeng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,244,399 B2 | 7/2007 | Myohanen et al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,562,928 B2 | 10/2013 | Gupta |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 9,017,627 B2 | 4/2015 | Gupta |
| 9,290,386 B2 | 3/2016 | Wasas |
| 9,376,318 B2 | 6/2016 | Fan et al. |
| 9,382,359 B2 | 7/2016 | Kanellopoulos et al. |
| 9,518,236 B2 | 12/2016 | Fan et al. |
| 9,573,118 B2 | 2/2017 | Colozzi et al. |
| 9,616,403 B2 | 4/2017 | Fan et al. |
| 2001/0055559 A1 | 12/2001 | Sanfilippo et al. |
| 2002/0011428 A1 | 1/2002 | Scheuerman |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |

(56) References Cited

U.S. PATENT DOCUMENTS

| | | |
|---|---|---|
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashdeh et al. |
| 2013/0149650 A1 | 6/2013 | Gauthier et al. |
| 2013/0255272 A1 | 10/2013 | Ajhar et al. |
| 2013/0261355 A1 | 10/2013 | Stamires |
| 2014/0034134 A1 | 2/2014 | Fan et al. |
| 2014/0144082 A1 | 5/2014 | Fan et al. |
| 2014/0275297 A1 | 9/2014 | Velazquez-Vargas et al. |
| 2015/0238915 A1 | 8/2015 | Fan et al. |
| 2016/0002034 A1 | 1/2016 | Fan et al. |
| 2016/0016800 A1 | 1/2016 | Noyes |
| 2016/0023190 A1 | 1/2016 | Fan et al. |
| 2016/0030904 A1 | 2/2016 | Fan et al. |
| 2016/0268616 A1 | 9/2016 | Fan et al. |
| 2016/0376512 A1 | 12/2016 | Fan et al. |

FOREIGN PATENT DOCUMENTS

| | | |
|---|---|---|
| CN | 1501534 | 6/2004 |
| CN | 101389734 | 3/2009 |
| CN | 101426885 | 5/2009 |
| CN | 102187153 | 9/2011 |
| CN | 102612625 | 7/2012 |
| EP | 0161970 | 11/1985 |
| EP | 1134187 | 9/2001 |
| EP | 1445018 | 8/2004 |
| EP | 1580162 | 9/2005 |
| EP | 1845579 | 10/2007 |
| EP | 1933087 | 6/2008 |
| EP | 2450420 | 5/2012 |
| EP | 2515038 | 10/2012 |
| EP | 2601443 | 6/2013 |
| EP | 1976633 | 3/2014 |
| FR | 2924035 | 5/2009 |
| JP | H10249153 | 9/1998 |
| JP | 2006-502957 | 1/2006 |
| TW | 406055 | 9/2000 |
| TW | 426728 | 3/2001 |
| WO | WO 1990/13773 | 11/1990 |
| WO | WO 1999/65097 | 12/1999 |
| WO | WO 2000/22690 | 4/2000 |
| WO | WO 2000/068339 | 11/2000 |
| WO | WO 2001/042132 | 6/2001 |
| WO | WO 2003/070629 | 8/2003 |
| WO | WO 2007/082089 | 7/2007 |
| WO | WO 2007/122498 | 11/2007 |
| WO | WO 2007/134075 | 11/2007 |
| WO | WO 2008/019079 | 2/2008 |
| WO | WO 2008/071215 | 6/2008 |
| WO | WO 2008/082312 | 7/2008 |
| WO | WO 2008/115076 | 9/2008 |
| WO | WO 2009/007200 | 1/2009 |
| WO | WO 2009/009388 | 1/2009 |
| WO | WO 2009/021258 | 2/2009 |
| WO | WO 2009/023515 A2 | 2/2009 |
| WO | WO 2009/114309 | 9/2009 |
| WO | WO 2010/037011 | 4/2010 |
| WO | WO 2010/063923 | 6/2010 |
| WO | WO 2010/126617 | 11/2010 |
| WO | WO 2011/021161 | 2/2011 |
| WO | WO 2011/031752 | 3/2011 |
| WO | WO 2011/031755 | 3/2011 |
| WO | WO 2011/084734 | 7/2011 |
| WO | WO 2012/064712 | 5/2012 |
| WO | WO 2012/077978 | 6/2012 |
| WO | WO 2012/155054 | 11/2012 |
| WO | WO 2012/155059 | 11/2012 |
| WO | WO 2013/040645 | 3/2013 |
| WO | WO 2014/085243 | 6/2014 |
| WO | WO 2011/153568 | 12/2014 |
| WO | WO 2014/195904 | 12/2014 |
| WO | WO 2016/053941 | 4/2016 |

OTHER PUBLICATIONS

Rostrup-Nielsen, "Syngas in Perspective," Catalysis Today, 2002, 71(3-4), 243-247.

Takanabe, "Catalytic Conversion of Methane: Carbon Dioxide Reforming and Oxidative Coupling," Journal of the Japan Petroleum Institute, 2012, 55, 1-12.

U.S. Appl. No. 13/394,572, filed Mar. 7, 2012, U.S. Pat. No. 9,371,227, Jun. 21, 2016.

U.S. Appl. No. 15/162,199, filed May 23, 2016, 2016/0268616, Sep. 15, 2016.

U.S. Appl. No. 13/394,396, filed Mar. 6, 2012, U.S. Pat. No. 9,518,236, Dec. 13, 2016.

U.S. Appl. No. 15/376,590, filed Dec. 12, 2016, 2017/0158964, Jun. 8, 2017.

U.S. Appl. No. 11/010,648, filed Dec. 13, 2004, U.S. Pat. No. 7,767,191, Aug. 30, 2010.

U.S. Appl. No. 13/121,009, filed Mar. 25, 2011, U.S. Pat. No. 8,877,147, Nov. 4, 2014.

U.S. Appl. No. 14/504,295, filed Oct. 1, 2014, U.S. Pat. No. 9,376,318, Jun. 28, 2016.

U.S. Appl. No. 15/191,249, filed Jun. 23, 2016, 2016/0376512, Dec. 29, 2016.

U.S. Appl. No. 13/883,795, filed Nov. 8, 2011, U.S. Pat. No. 10,010,847, Jul. 3, 2018.

U.S. Appl. No. 14/116,627, filed May 11, 2012, U.S. Pat. No. 9,777,920, Oct. 3, 2017.

U.S. Appl. No. 15/685,951, filed Aug. 24, 2017, 2017/0370573, Dec. 28, 2017.

U.S. Appl. No. 14/116,636, filed May 11, 2012, U.S. Pat. No. 9,903,584, Dec. 27, 2018.

U.S. Appl. No. 61/779,408, filed Mar. 13, 2013.

U.S. Appl. No. 14/775,044, filed Mar. 13, 2014, 2016/0030904, Feb. 4, 2016.

WO2014/159956, Oct. 2, 2014.

U.S. Appl. No. 61/781,452, filed Mar. 14, 2013.

WO2014/152814, Sep. 25, 2014.

U.S. Appl. No. 61/779,070, filed Mar. 13, 2013.

(56) References Cited

OTHER PUBLICATIONS

U.S. Appl. No. 14/774,727, filed Mar. 13, 2014, 2016/0023190, Jan. 28, 2016.
U.S. Appl. No. 15/919,748, filed Mar. 13, 2018.
WO2014/160223, Oct. 2, 2014.
U.S. Appl. No. 61/782,526, filed Mar. 14, 2013.
U.S. Appl. No. 14/774,730, filed Mar. 13, 2014, U.S. Pat. No. 9,616,403, Jan. 21, 2016.
PCT/US2014/028217, Mar. 14, 2014.
U.S. Appl. No. 61/875,418, filed Sep. 9, 2013.
U.S. Appl. No. 61/875,425, filed Sep. 9, 2013.
U.S. Appl. No. 12/160,803, filed Jul. 14, 2008, 2009/0000194, Jan. 1, 2009.
U.S. Appl. No. 14/091,654, filed Nov. 27, 2013, 2014/0144082, May 29, 2014.
U.S. Appl. No. 13/644,973, filed Oct. 4, 2012, 2013/0085365, Apr. 4, 2013.
U.S. Appl. No. 61/945,257, filed Feb. 27, 2014.
U.S. Appl. No. 62/041,703, filed Aug. 26, 2014.
U.S. Appl. No. 14/634,319, filed Feb. 27, 2015, 2015/0238915, Aug. 27, 2015.
U.S. Appl. No. 15/647,084, filed Jul. 11, 2017, U.S. Pat. No. 10,022,693, Jul. 17, 2018.
WO2015/131117, Sep. 3, 2015.
U.S. Appl. No. 62/310,476, filed Mar. 18, 2016.
U.S. Appl. No. 62/321,607, filed Apr. 12, 2016.
U.S. Appl. No. 16/091,253, filed Oct. 4, 2018.
WO2017/180763, Oct. 19, 2017.
U.S. Appl. No. 62/341,294, filed May 25, 2016.
U.S. Appl. No. 16/091,508, filed Oct. 4, 2018.
WO2017/205638, Nov. 30, 2017.
U.S. Appl. No. 62/519,376, filed Jun. 14, 2017.
U.S. Appl. No. 62/546,886, filed Aug. 17, 2017.
U.S. Appl. No. 62/539,374, filed Jul. 31, 2017.
U.S. Appl. No. 62/565,565, filed Sep. 29, 2017.
U.S. Appl. No. 62/589,144, filed Nov. 21, 2017.
PCT/US2018/044530, Jul. 31, 2018.
U.S. Appl. No. 62/623,355, filed Jan. 29, 2018.
U.S. Appl. No. 62/716,705, filed Aug. 9, 2018.
U.S. Appl. No. 62/734,387, filed Sep. 21, 2018.
U.S. Pat. No. 9,903,584 2014/0072917, Fan et al., Mar. 13, 2014.
U.S. Pat. No. 9,777,920 2014/0295361, Fan et al., Oct. 3, 2017.
Abad et al., "Chemical-looping combustion in a 300 W continuously operating reactor system using a manganese-based oxygen carrier," Fuel, 2006, vol. 85, Issue 9, pp. 1174-1185.
Abad et al., "Reduction Kinetics of CU-, Ni-, and Fe- Based Oxygen Carriers Using Syngas (CO +H2) for Chemical-Looping Combustion," Energy Fuels, 2007, 21 (4), pp. 1843-1853.
Abad et al., "The use of iron oxide as oxygen carrier in a chemical-looping reactor," Fuel, 2007, vol. 86, Issues 7-8, pp. 1021-1035.
Adanez et al., "Progress in Chemical-Looping Combustion and Reforming technologies," Progress in Energy and Combustion Science, 2012, vol. 38, Issue 2, pp. 215-282.
Adanez et al., "Selection of oxygen carriers for chemical-looping combustion," Energy & Fuels, American Chemical Society, 2004, vol. 18, No. 2, pp. 371-377.
Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.
Balasubramanian et al., "Hydrogen from methane in a single-step process," Chem Engr Science, 1999, 54(15-16), 3543.
Bell et al., "H2 Production via Ammonia Decomposition Using Non-Noble Metal Catalysts: A Review," Top Catal, 2016, 59, 1438-1457.
Cao et al., "Investigation of Chemical Looping Combustion by Solid Fuels. 1. Process Analysis," Energy Fuels, 2006, 20(5), pp. 1836-1844.

Cheng et al., "Carbon Dioxide Adsorption and Activation on Ceria (110): A density functional theory study," J. Chem. Phys. 2013, 138, 014702.
Cheng et al., "Methane Adsorption and Dissociation on Iron Oxide Oxygen Carrier: Role of Oxygen Vacancy," Phys. Chem. Chem. Phys. 2016, 18, 16423-16435.
Cheng et al., "Propagation of Olefin Metathesis to Propene on WO3 Catalysts: A Mechanistic and Kinetic Study," ACS Catal. 2015, 5, 59-72.
Cho et al., "Comparison of iron-, nickel-, copper- and manganese-based oxygen carriers for chemical-looping combustion," Fuel, 2004, vol. 83, Issue 9, pp. 1215-1225.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2012, pp. 1274-1281.
De Diego et al., "Development of Cu-based oxygen carriers for chemical-looping combustion," Fuel, 2004, vol. 83, Issue 13, pp. 1749-1757.
De Klerk, "Gas-to-Liquid Conversion" Natural Gas Conversion Technologies Workshop of ARPA-E. U.S. Department of Energy, Houston, TX. vol. 13 (2012).
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Forzatti, "Present status and perspectives in de-NOx SCR catalysis." Appl. Catal. A: Gen., 222(1-2), 2001, 221-236.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion sys-

(56) References Cited

OTHER PUBLICATIONS tems: Assessment of system operation and resource requirements," International Journal of Hydrogen Energy, 2009, vol. 34, Issue 6, pp. 2606-2615.

Go et al., "Hydrogen production from two-step steam methane reforming in a fluidized bed reactor," International Journal of Hydrogen Energy, 2009, vol. 34, p. 1301-1309.

Goellner, J. F., V. Shah, M. J. Turner, N. J. Kuehn, J. Littlefield, G. Cooney, and J. Marriott, "Analysis of Natural Gas-to Liquid Transportation Fuels via Fischer-Tropsch," United States Department of Energy/NETL, DOE/NETL-2013/1597, Pittsburgh, PA (2013).

Haque, "Microwave energy for mineral treatment processes—a brief review," International Journal of Mineral Processing, vol. 57, pp. 1-24, 1999.

Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.

Hildebrandt et al., "Producing Transportation Fuels with Less Work," Science, Mar. 27, 2009, vol. 323, pp. 1680-1681.

Hossain et al., "Chemical-looping combustion (CLC) for inherent $CO_2$ separations—a review," Chemical Engineering Science, 2008, vol. 63, Issue 18, pp. 4433-4451.

Hua et al., "Three Dimensional Analysis of Electrical Capacitance Tomography Sensing Fields," 1999 IOP Publishing LTD, vol. 10, pp. 717-725.

Huijgen et al., "Carbon dioxide sequestrationby mineral carbonation," ECN-C--03-016, www.ecn.nl/docs/library/report/200e/c03016.pdf, Feb. 2003.

Hung et al., "Zeolite ZSM-5 Supported Bimetallic Fe-Based Catalysts for Selective Catalytic Reduction of NO: Effects of Acidity and Metal Loading," Advanced Porous Materials, 2016, 4(3): 189-199(11).

Imanaka et al., "Advances in Direct NOx Decomposition Catalysts," Appl. Catal. A: Gen., 431-432, 2012, 1-8.

Ishida et al., "Evaluation of a Chemical-Looping-Combustion Power-Generation System by Graphic Exergy Analysis," Energy, 12(2), 147-154 (1987).

Iwamoto et al., "Influence of sulfur dioxide on catalytic removal of nitric oxide over copper ion-exchanged ZSM-5 Zeolite." Appl. Catal., 69(2), 1991, 15-19.

Izquierdo et al., "Catalyst Deactivation and Regeneration Processes in Biogas Tri-Reforming Process. The Effect of Hydrogen Sulfide Addition," Catalysts, 2018, 8(12): 19 pages.

Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.

Jin et al., "Development of a Novel Chemical-Looping Combustion: Synthesis of a Looping Material with a Double Metal Oxide of CoO—NiO," Energy & Fuels, 1998, vol. 12, 1272-1277.

Johansson et al., "Combustion of Syngas and Natural Gas in a 300 W Chemical-Looping Combustor," Chemical Engineering Research and Design Volume, 2006, vol. 84, Issue 9, pp. 819-827.

Kaiser et al., "Precombustion and Postcombustion Decarbonization," IEEE, Power Engineering Review, Apr. 2001, pp. 15-17.

Kathe et al., "Chemical Looping Gasification for Hydrogen Enhanced Syngas Production with in-situ $CO_2$ Capture," United States Department of Energy, OSTI: 1185194, (2015).

Kiuchi et al., "Recovery of hydrogen from hydrogen sulfide with metals or metal sulfides," Int. J. Hydrogen Energy, 1982, 7: 477-482.

Leion et al., "Solid fuels in chemical-looping combustion using oxide scale and unprocessed iron ore as oxygen carriers," Fuel, 2009, vol. 88, Issue 10, pp. 1945-1954.

Leion et al., "Solid fuels in chemical-looping combustion," International Journal of Greenhouse Gas Control, 2008, vol. 2, Issue 2, pp. 180-193.

Leion et al., "The use of petroleum coke as fuel in chemical-looping combustion," Fuel, 2007, vol. 86, Issue 12-13, pp. 1947-1958.

Li et al., "Clean coal conversion processes—progress and challenges," The Royal Society of Chemistry, Energy & Environmental Science, Jul. 30, 2008, vol. 1, pp. 248-267.

Li et al., "Ionic Diffusion in the Oxidation of Iron-effect of Support and Its Implications to Chemical Looping Applications," Energy Environ. Sci. 2011, 4, 876-880.

Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.

Li et al., "Syngas chemical looping gasification process: Bench-scale studies and reactor simulations," AICHE Journal, 2010, vol. 56, Issue 8, pp. 2186-2199.

Li et al., "Syngas Chemical Looping Gasification Process: Oxygen Carrier Particle Selection and Performance," Energy Fuels, 2009, 23(8), pp. 4182-4189.

Liu et al., "Enhanced Performance of Alkali Metal Doped $Fe_2O_3$ and $Fe_2O_3/Al_2O_3$ Composites as Oxygen Carrier Material in Chemical Looping Combustion," Energy Fuels, 2013, 27, 4977-4983.

Liu et al., "Recent Advances in Catalytic DeNOx Science and Technology," Catalysis Reviews, 48(1), 2006, 43-89.

Luo et al., "Shale Gas-to-Syngas Chemical Looping Process for Stable Shale Gas Conversion to High Purity Syngas with $H_2$:CO Ratio of 2:1," Energy and Environmental Science, 7(12), 4104-4117, (2014).

Lyngfelt, "Chemical Looping Combustion of Solid Fuels—Status of Development," Applied Energy, 2014, vol. 113, p. 1869-1873.

Lyngfelt, "Oxygen Carriers for Chemical Looping Combustion Operational Experience," 1st International Conference on Chemical Looping, Mar. 2010.

Makepeace et al., "Ammonia decomposition catalysis using non-stoichiometric lithium imide," Chem. Sci., 2015, 6, 3805.

Mamman et al., "Simultaneous steam and $CO_2$ reforming of methane to syngas over NiO/MgO/SA-5205 in presence and absence of oxygen," Applied Catalysis A, 1998, vol. 168, p. 33-46.

Mao et al., "Facile synthesis of phase-pure $FeCr_2Se_4$ and $FeCr_2S_4$ nanocrystals via a wet chemistry method," J. Mater. Chem. C, 2014, 2: 3744-3749.

Marashdeh, Q. et al., "A Multimodal Tomography System Based on ECT Sensors," IEEE Sensors Journal, vol. 7, No. 3, 2007, 426-433.

Marashdeh, Q., Advances in Electrical Capacitance Tomography, Dissertation, The Ohio State University, 2006.

Masui et al., "Direct Decomposition of NO into $N_2$ and $O_2$ Over C-type Cubic $Y_2O_3$—$Tb_4O_7$—$ZrO_2$," Materials Sciences and Applications, 3(10), 2012, 733-738.

Mattisson et al., "Application of chemical-looping combustion with capture of $CO_2$," Second Nordic Minisymposium on Carbon Dioxide Capture and Storage, Goeteborg, Oct. 26, 2001, pp. 46-51.

Mattisson et al., "Chemical-looping combustion using syngas as fuel," International Journal of Greenhouse Gas control, 2007, vol. 1, Issue 2, pp. 158-169.

Mattisson et al., "$CO_2$ capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.

Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.

Mattisson et al., "The use of iron oxide as an oxygen carrier in chemical-looping combustion of methane with inherent separation of $CO_2$," Fuel, 2001, vol. 80, pp. 1953-1962.

Mattisson et al., "Use of Ores and Industrial Products As Oxygen Carriers in Chemical-Looping Combustion," Energy & Fuels, 2009, vol. 23, pp. 2307-2315.

Miller et al., "Toward Transformational Carbon Capture," AIChE Journal, 62, 1-10 (2016).

NETL, National Energy Technology Laboratory. U.S. Department of Energy, "Quality Guidelines for Energy System Studies—Specification for Selected Feedstocks." Jan. 2012.

(56) References Cited

OTHER PUBLICATIONS

NETL, National Energy Technology Laboratory. U.S. Department of Energy, "Syngas Contaminant Removal and Conditioning," webpage accessed on Jul. 8, 2018.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in A Pressurized Fluidized Bed Reactor Using Ni-based Oxygen Carriers," International Journal of Hydrogen Energy, 2010, vol. 35, p. 151-160.
Osha, "Hydrogen Sulfide in Workplaces," <https://www.osha.gov/SLTC/hydrogensulfide/hydrogensulfide_found.html> webpage accessed Jul. 8, 2018.
Park et al., "CO2 Mineral Sequestration: Chemically Enhanced Aqueous Carbonation of Serpentine," The Canadian Journal of Chemical Engineering, 2003, vol. 81, pp. 885-890.
Park et al., "CO2 Mineral Sequestration: physically activated dissolution of serpentine and pH swing process," Chemical Engineering Science, 2004, vol. 59, pp. 5241-5247.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chemical Looping Processes," ACS Energy Letters, 2017, 2, 70-74.
Qin et al., "Nanostructure Formation Mechanism and Ion Diffusion in Iron-Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combustion," Journal of Materials Chemistry A, 2017, 8 pages.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Sassi et al., "Sulfur Recovery from Acid Gas Using the Claus Process and High Temperature Air Combustion ( HiTAC ) Technology," Am. J. Environ. Sci., 2008, 4, 502-511.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Shick et al., "Single crystal growth of $CoCr_2S_4$ and $FeCr_2S_4$," Journal of Crystal Growth, 1969, 5(4): 313-314.
Sridhar et al., "Syngas Chemical Looping Process: Design and Construction of a 25 kWth Subpilot Unit," Energy Fuels, 2012, 26(4), pp. 2292-2302.

Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Thiollier et al., "Preparation and Catalytic Properties of Chromium-Containing Mixed Sulfides," Journal of Catalysis, 2011, 197(1): 58-67.
Tian et al., "Thermodynamic investigation into carbon deposition and sulfur evolution in a Ca-based chemical-looping combustion system," Chemical Engineering Research & Design, 2011, vol. 89, Issue 9, p. 1524.
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
U.S. Department of Energy, NCCTI Energy Technologies Group, Office of Fossil Energy, "CO2 Capture and Storage in Geologic Formations," pp. 34, Revised Jan. 8, 2002.
United States Environmental Protection Agency. "Air Pollution Control Technology Fact Sheet: Selective Catalytic Reforming," <https://www3.epa.gov/ttncatc1/cica/files/fscr.pdf> (2003).
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Wang et al., Study of bimetallic interactions and promoter effects of FeZn, FeMn and FeCr Fischer—Tropsch synthesis catalysts, Journal of Molecular Catalysis A: Chemical, 2010, 326:29-40.
Warsito, W. et al., Electrical Capacitance Volume Tomography, 2007, pp. 1-9.
Watanabe, "Electrical properties of $FeCr_2S_4$ and $CoCr_2S_4$," Solid State Communications, 1973, 12(5): 355-358.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Preliminary Report on Patentability for International Application PCT/US2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).
International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.

(56) References Cited

OTHER PUBLICATIONS

International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
International Search Report and Written Opinion for Application No. PCT/US2018/044530 dated Oct. 17, 2018 (13 pages).
Australian Patent Examination Report No. 1 for Application No. 2014214982 dated Nov. 2, 2016 (3 pages).
Australian Patent Office Examination Report No. 2 for Application No. 2014214982 dated Sep. 18, 2017 (3 pages).
Chinese Patent Office Action for Application No. 201480016427.9 dated Sep. 14, 2016 (16 pages, English translation included).
Chinese Patent Office Action for Application No. 201480016427.9 dated Jul. 6, 2017 (10 pages, English translation included).
Chinese Patent Office Action for Application No. 201480016427.9 dated Feb. 23, 2018 (7 pages, English translation included).
European Patent Office Extended Search Report for Application No. 14749268.0 dated Oct. 14, 2016 (9 pages).
European Patent Office Action for Application No. 14749268.0 dated Apr. 13, 2018 (5 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Notice of Allowance for U.S. Appl. No. 13/394,396 dated Aug. 3, 2016 (8 pages).
United States Patent Office Action for U.S. Appl. No. 15/376,590 dated Mar. 9, 2018 (10 pages).
United States Patent Office Action for U.S. Appl. No. 15/376,590 dated Oct. 19, 2018 (8 pages).
Final Rejection pertaining to U.S. Appl. No. 13/121,009 dated Mar. 14, 2013.
Advisory Action pertaining to U.S. Appl. No. 13/121,009 dated Jun. 24, 2013.
Office Action pertaining to U.S. Appl. No. 13/121,009 dated Sep. 13, 2013.
Final Rejection pertaining to U.S. Appl. No. 13/121,009 dated Jan. 16, 2014.
Office Action pertaining to U.S. Appl. No. 13/121,009 dated Sep. 6, 2012.
United States Patent Office Notice of Allowance for U.S. Appl. No. 14/504,295 dated Sep. 28, 2015 (10 pages).
United States Patent Office Action for U.S. Appl. No. 15/191,249 dated Dec. 28, 2017 (14 pages).
United States Patent Office Notice of Allowance for U.S. Appl. No. 15/191,249 dated May 22, 2018 (8 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/883,795 dated Jan. 22, 2018 (7 pages).
United States Patent Office Action for U.S. Appl. No. 14/116,627 dated Oct. 20, 2016 (6 Pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Final Rejection for U.S. Appl. No. 14/116,636 dated Oct. 24, 2016 (10 pages).
United States Patent Office Notice of Allowance for U.S. Appl. No. 14/116,636 dated Nov. 7, 2017 (5 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/766,086 dated Jan. 2, 2018 (21 pages).
United States Patent Office Notice of Allowance for U.S. Appl. No. 14/766,086 dated Aug. 8, 2018 (9 pages).
United States Patent Office Action for U.S. Appl. No. 14/775,044 dated May 30, 2017 (15 pages).
United States Patent Office Action for U.S. Appl. No. 14/775,044 dated Feb. 26, 2018 (16 pages).
United States Patent Office Action for U.S. Appl. No. 14/774,727 dated Sep. 14, 2017 (10 pages).
United States Patent Office Notice of Allowance for U.S. Appl. No. 14/774,730 dated Nov. 16, 2016 (10 pages).
Office Action pertaining to U.S. Appl. No. 12/160,803 dated Jun. 7, 2011.
Final Rejection pertaining to U.S. Appl. No. 12/160,803 dated Jan. 5, 2012.
Office Action pertaining to U.S. Appl. No. 12/160,803 dated Jun. 5, 2012.
Final Rejection pertaining to U.S. Appl. No. 12/160,803 dated Mar. 22, 2013.
Advisory Action pertaining to U.S. Appl. No. 12/160,803 dated Jul. 11, 2013.
Examiner's Answer before the Patent Trial and Appeal Board for U.S. Appl. No. 12/160,803 dated Nov. 4, 2013.
United States Patent Office Action for U.S. Appl. No. 12/160,803 dated Feb. 23, 2016 (27 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Action for U.S. Appl. No. 14/634,319 dated Nov. 7, 2016 (7 pages).
United States Patent Office Action for U.S. Appl. No. 14/634,319 dated Apr. 11, 2017 (9 pages).
United States Patent Office Action for U.S. Appl. No. 15/647,084 dated Dec. 26, 2017 (7 pages).
United States Patent Office Notice of Allowance for U.S. Appl. No. 15/647,084 dated Mar. 19, 2018 (8 pages).
Carrero et al., "A critical literature review of the kinetics for the oxidative dehydrogenation of propane over well-defined supported vanadium oxide catalysts," ACS Catalysis, 2014, 4: 3357-3380.

(56) References Cited

OTHER PUBLICATIONS

Cavani et al., "Oxidative dehydrogenation of ethane and propane: How far from commercial implementation?" Catalysis Today, 2007, 127(1): 113-131.
Koulialias et al., "Ordered defects in Fe 1-x S generate additional magnetic anisotropy symmetries," Journal of Applied Physics, 2018, 123(3): 033902, 10 pages.
Moreira, "Steam Cracking: Kinetics and Feed Characterization," Dissertation, 2015, 10 pages.
Wang et al., "Highly efficient metal sulfide catalysts for selective dehydrogenation of isobutane to isobutene," ACS Catalysis, 2014, 4: 1139-1143.
United States Patent Office Action for U.S. Appl. No. 15/685,951 dated May 14, 2019 (10 pages).
Sattler et al., "Catalytic Dehydrogenation of Light Alkanes on Metals and Metal Oxides," Chem Rev, 2014, 114(20): 10613-10653.
United States Patent Office Notice of Allowance for U.S. Appl. No. 15/685,951 dated Aug. 12, 2019 (5 pages).

METHODS FOR FUEL CONVERSION

CROSS REFERENCE TO RELATED APPLICATIONS

This application is a continuation of U.S. patent application Ser. No. 14/766,086, filed on Aug. 5, 2015, now issued as U.S. Pat. No. 10,144,640, which is a U.S. National Stage Entry of International Patent Application No. PCT/US2014/014877, filed on Feb. 5, 2014, which claims priority to U.S. Provisional Patent Application No. 61/779,243, filed on Mar. 13, 2013, and U.S. Provisional Patent Application No. 61/761,016, filed on Feb. 5, 2013, the entire contents of each of which are fully incorporated herein by reference.

BACKGROUND

Field

The present disclosure relates to chemical looping systems and methods, and specifically to systems and methods for producing syngas from feedstock fuels.

Technical Background

There is a constant need for clean and efficient energy generation systems. Many of the commercial processes that generate energy carriers such as steam, hydrogen, synthesis gas (syngas), liquid fuels, and/or electricity are based on fossil fuels. Furthermore, the dependence on fossil fuels is expected to continue in the foreseeable future due to the lower costs compared to some renewable sources. Current conversion methods of carbonaceous fuels may emit large quantities of carbon dioxide to the environment and may require significant capital and operational costs. Sulfur and nitrogen compounds may also be generated in these processes due to the complex contents of coal.

A need is present for improved systems and methods for converting fuel, and system components therein, which can convert fuel effectively while reducing pollutants.

SUMMARY

In one embodiment, fuel may be converted into syngas by a method comprising feeding the fuel and composite metal oxides into a reduction reactor in a co-current flow pattern relative to one another, reducing the composite metal oxides with the fuel to form syngas and reduced composite metal oxides, transporting the reduced composite metal oxides to an oxidation reactor, regenerating the composite metal oxides by oxidizing the reduced composite metal oxides with an oxidizing reactant in the oxidation reactor, and recycling the regenerated composite metal oxides to the reduction reactor for subsequent reduction reactions to produce syngas. The composite metal oxides may be solid particles comprising a primary metal oxide and a secondary metal oxide.

In another embodiment, natural gas may be used as a fuel and may be converted into syngas by a method comprising feeding the fuel and composite metal oxides into a reduction reactor in a co-current flow pattern relative to one another, reducing the composite metal oxides with the fuel to form syngas and reduced composite metal oxides, transporting the reduced composite metal oxides to an oxidation reactor, regenerating the composite metal oxides by oxidizing the reduced composite metal oxides with an oxidizing reactant in the oxidation reactor, and recycling the regenerated composite metal oxides to the reduction reactor for subsequent reduction reactions to produce syngas. The composite metal oxides may be solid particles comprising a primary metal oxide and a secondary metal oxide. The composite metal oxide may comprise iron oxide and titanium oxide, or the composite metal oxide comprises iron oxide and aluminum oxide. The iron oxide may be reduced in the reduction reaction from $FeO_x$ to $FeO_y$, and $1.5 > x > 1 > y > 0.3$.

According to yet another embodiment, fuel may be converted by a method comprising reducing the composite metal oxides with the fuel to form syngas and reduced composite metal oxides, and regenerating the composite metal oxides by oxidizing the reduced composite metal oxides with an oxidizing reactant. The composite metal oxides are solid particles may comprise primary metal oxide and a secondary metal oxide. The composite metal oxide may comprise iron oxide and titanium oxide, or the composite metal oxide may comprise iron oxide and aluminum oxide. The reducing of the composite metal oxides and the oxidizing of the composite metal oxides may be carried out in a fixed bed with a gas switching system. Alternatively, the reducing of the composite metal oxides may occur in a reduction reactor, wherein the reduction reactor is a moving bed reactor comprising two gas outlets and the reducing of the composite metal oxides produces syngas and $CO_2$. Alternatively, the reducing and oxidizing of composite metal oxide may occur in a membrane based reactor, wherein the composite metal oxides are integrated to the fuel side of the membrane based reactor.

Additional features and advantages of the devices and methods for chemical conversion systems and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
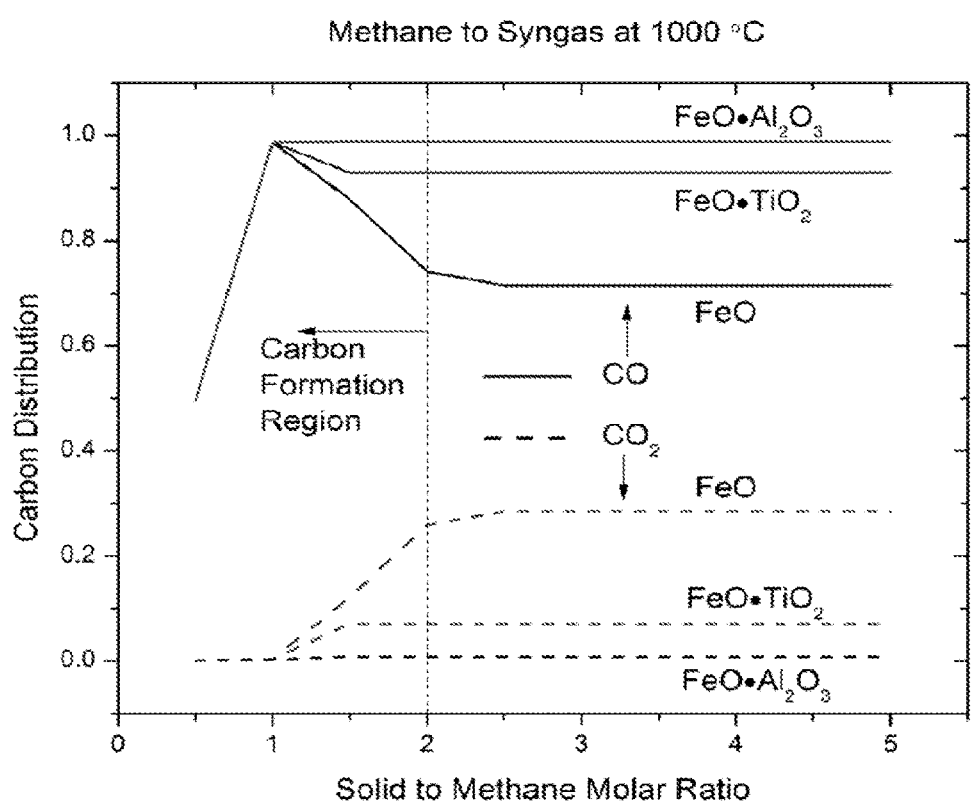
FIG. 1 is a graph comparing the equilibrium carbon distribution difference with various ratios between methane and single/composite metal oxides, according to one or more embodiments shown and described herein.

Described herein are systems and method for converting fuel sources, sometimes referred to as feedstock fuels, into syngas. Generally, syngas comprises carbon monoxide and hydrogen, and may comprise some other chemicals, such as, but not limited to, carbon dioxide and steam ($H_2O$). In one embodiment, a reduction reaction of composite metal oxides may produce syngas from a fuel and an oxidation reaction may regenerate the reduced composite metal oxides. As used herein, the reduction reaction may be referred to as a "first step" or "step one", and the oxidation reaction may be referred to as "second step" or "step two". The reduction reaction may take place in a reduction reactor and the oxidation reaction may take place in a separate oxidation reactor. In some embodiments, syngas may comprise at least about at least about 50 mol %, at least about 60 mol %, at least about 70 mol %, at least about 80 mol %, or even at least about 85% of the combination of carbon monoxide and hydrogen, such that the sum of the mol % of carbon monoxide and the mol % of hydrogen is at least about 50 mol %, at least about 60 mol %, at least about 70 mol %, at least about 80 mol %, or even at least about 85%. The stoichiometric ratio of carbon monoxide to hydrogen in the syngas produced may be about 1:2, such as between about 1:3 and about 1:1. However, the ratio may be controlled by the process parameters such as reaction conditions and reactants. The syngas may have little carbon dioxide and steam present, such as, for example, less than about 10 mol %, less than about 5%, or even less than about 2% of carbon dioxide and less than about 10 mol %%, less than about 5%, or even less than about 2% steam, respectively. The syngas may have little carbon formation, such as less than about 10 mol %. The syngas may be ready for use in downstream synthesis reactions to produce various hydrocarbons (C≥1) such as, but not limited to, methanol, dimethyl ether, gasoline, and diesel. The reduced composite metal oxide from the reduction reaction (after the syngas production) may be regenerated by oxidation with air, or another oxidant such as oxygen, steam, carbon dioxide, or combinations thereof, and then may be recycled back to the initial reduction reactor, such that the composite metal oxides may be recycled and may be continually used in the oxidation and reduction reactions. The cyclic reduction (endothermic) and oxidation (exothermic) reactions of composite metal oxides may form a reaction and heat integrated process loop that may perpetuate.

The fuel and composite metal oxides may flow in a co-current pattern relative to one another in the reduction reactor. For example, in one embodiment the co-current gas-solid flow may be either upward or downward. The reduction reactor may be, for example, a moving bed reactor, rotary kiln, riser, downer, or gas switching fixed bed. In one embodiment, the co-current reactor design may allow the natural gas, or other fuel, conversion to achieve completion wherein the composite metal oxides may be reduced to an oxidation state that provides a high quality of product syngas (i.e., at least about 90 mol % carbon monoxide and hydrogen). The composite metal oxides may act as a heat and oxygen transfer media to balance the energy and mass between the two steps (the oxidation and reduction reactions).

The composite metal oxides may act as oxygen carrying materials in the processes described herein. The composite metal oxides may comprise primary metal oxides and secondary metal oxides, including, but not limited to, $FeO_x$ (primary)—$Al_2O_3$ (secondary) and $FeO_x$ (primary)—$TiO_2$ (secondary), where $0.3<x<1$. The primary to secondary metal oxide weight ratios may be about 15:85 to about 85:15, which may promote high $CO/CO_2$ and $H_2/H_2O$ ratios (i.e., at least about 6) in the product syngas and to avoid carbon formation. Primary metal oxides may comprise, for example, oxides of Fe, V, Cr, Mn, Co, Ni, Cu, Zn, W, Pb, Ce, Sn, Mo, or combinations thereof. Secondary metal oxides may comprise, for example, oxides of Ti, Al, Si, Ca, Y and Zr, or combinations thereof. The composite metal oxide may further comprise dopants/promoters, such as, but not limited to, Ca, Ce, Pt, Ru, Rh, La, Fe, Cu, oxides thereof, and combinations thereof. The dopants/promoters may assist in the oxidation and/or reduction reactions and to enhance the rate of reactions, and may serve as an inert support or binder that may enhance the mechanical properties of the composite metal oxides. Through the reduction reaction, the composite metal oxide may provide a high quality of product syngas at the outlet of the reactor. Following the reduction reaction, the reduced state composite metal oxide (any weight percentage) may comprise primary and secondary metal oxides, such as $FeO_x$—$Al_2O_3$ or $FeO_x$—$TiO_2$, at oxidation states of the +0 state, i.e., Fe, and the +2 state, i.e., FeO.

In addition to natural gas, other carbonaceous fuels in the form of gas, liquid and solid may also be used, such as feedstock fuels including, but not limited to, coal, biomass, petroleum coke, naphtha, residual oil, shale gas, $C_2$-$C_4$ light hydrocarbons, and combinations thereof. The systems and methods described herein may convert these feedstock fuels using the same type of reactors and same types of composite metal oxides as for natural gas, to carbon monoxide and hydrogen at near the stoichiometric ratio, e.g., 1:0.6 to 1:0.8 for biomass, with little carbon dioxide presence (less than about 10 mol %). In one embodiment, feedstock fuel may be co-injected with a carbon-rich or hydrogen-rich reactant to change the carbon monoxide to hydrogen ratio of the syngas. For these feedstocks, the $CO/H_2$ ratio of the product syngas may be adjusted to any desired ratio for downstream product synthesis, such as 1:2, by means of co-injection of these feedstock fuels with "carbon-rich" (such as $CO_2$ and coal) or "hydrogen-rich" (such as $H_2O$ and $CH_4$) reactants. For example, with biomass as the feedstock fuel, the $CO/H_2$ ratio may be adjusted to 1:1 by co-injection of the biomass with methane, a hydrogen-rich reactant. Such syngas composition adjustment in the system and method described herein may require only a minimal amount of co-injecting reactants and may be significantly lower compared to the amount of the co-injecting reactants used in the conventional methods.

In another embodiment, the $CO/H_2$ ratio may be adjusted to produce a high hydrogen content syngas by reaction of the reduced composite metal oxide with steam to produce hydrogen. The hydrogen may then be used to adjust the syngas $CO/H_2$ ratio to a higher level in $H_2$ contents. The steam oxidized composite metal oxide may be oxidized by air to its original oxidation state of the composite metal oxide for reuse in an oxidation reaction in an oxidation reactor.

Conventional syngas production methods from natural gas or other carbonaceous feedstocks may require cost intensive heat-exchanger type reactor, air separation unit, and/or a large amount of $CO_2/H_2O$ reactants for controlling the feedstock conversion and product quality. The system and method described herein that carries out the selective oxidation reaction by the redox cycle of composite metal oxides may eliminate the need for the use of complicated reactors, air separation unit and excessive $CO_2/H_2O$ reactants. The specially tailored composite metal oxides described herein coupled with the gas-solid co-current flow reactor design may directly convert the feedstock fuel to a high quality syngas yielding a high feedstock fuel conversion efficiency, flexible syngas product CO to $H_2$ ratio, low $CO_2$ and $H_2O$ concentrations in the product gas, and little carbon deposition. The overall process may be auto-thermal with composite metal oxides transferring heat between the reactions. The operation temperature may range from about 500° C. to about 1200° C. for the reduction (endothermic) reaction of composite metal oxide, and from about 600° C. to about 1250° C. for the oxidation (exothermic) reaction of composite metal oxide. The operation pressure may range from about 1 to about 50 bars, which may depend on the pressure of feedstocks as well as the requirement of downstream syngas conversion process. The feedstocks such as air and fuel may be preheated up to 1000° C. to increase the fuel to syngas conversion efficiency.

Syngas may be a chemical precursor for synthesis of liquid fuels and chemicals. It may be a mixture of predominantly carbon monoxide (CO) and hydrogen ($H_2$) produced from the partial oxidation of a variety of feedstocks including, but not limited to, natural gas, shale gas, coal, biomass, naphtha, residual oil, petroleum coke, etc. Depending on the feedstocks and processing methods, the syngas composition and quality may vary significantly. Table 1 compares some conventional syngas production approaches, including steam methane reforming (SMR), dry methane reforming (DMR), partial oxidation (PDX), autothermal reforming (ATR)/two-step reforming, dry coal gasification, and coal slurry gasification.

TABLE 1

Conventional Syngas Production Processes

| Process | Feed-stocks | CO:$H_2$ molar ratio | $CO_2$ level | Temperature, ° C. | Reactor(s) |
|---|---|---|---|---|---|
| SMR | $CH_4$, $H_2O$ | 1:2.8-4.8 | High | 800-900 | externally heated tubular catalytic reactor |
| DMR | $CH_4$, $CO_2$ $H_2O$ | 1:1-3 | high | 800-900 | externally heated tubular catalytic reactor |
| POX | $CH_4$, $O_2$ | 1:1.7-1.8 | low | >1300 | high temperature non-catalytic reactor |
| ATR/two step | $CH_4$, $O_2$, $H_2O$ | 1:1.8-4 | high | 900-1100 | combination of SMR and POX |
| Dry coal gasification | Coal, $O_2$ | 1:1-1.2 | low | 1500 | Entrained bed with heat recovery |
| Coal slurry gasification | Coal, $O_2$, $H_2O$ | 1:1.2-1.5 | high | 1400 | Entrained bed |

The CO to $H_2$ ratio may directly affect the downstream application of the produced syngas. For example, a molar ratio of CO to $H_2$ of 1:2 may be commonly used for the synthesis of liquid fuels such as, but not limited to, gasoline, diesel, and methanol, while a ratio of about 1:1 may be used for production of acetic acid, acetic anhydride, or formaldehyde. Ratios less than 1:3 may be used in combination with a water gas shift unit for hydrogen production and ammonia synthesis.

As shown in Table 1, a conventional SMR process may produce a hydrogen rich syngas due to the excess amount of steam introduction, which may limit its application to hydrogen and ammonia synthesis. Due to the reduced steam flow and slow $CO_2$ reaction kinetics of DMR, carbon formation from methane decomposition may result. The reactions occurring in the SMR and DMR processes may be endothermic, favoring higher operating temperature for greater fuel conversion. Both processes may be commonly performed using costly heat exchanger type reactors, where fuel combustion externally provides the heat necessary to drive the catalytic reactions for syngas production. Considering the reactor materials, the SMR and DMR processes may operate below 900° C., thermodynamically restricting the methane conversion.

POX and dry coal gasification processes may be operated at a much higher temperature as the partial oxidation of the fuel with oxygen may be exothermic and may provide the heat for the process. The CO to $H_2$ ratio from these processes may depend upon the atomic carbon and hydrogen content of the fuel feedstock, which may pose limitations on downstream chemical and fuel synthesis. Their associated high process temperatures also may require capital-intensive heat recovery systems. In ATR, two-step methane reforming, and coal slurry gasification processes, steam and/or water may be introduced to promote a water gas shift reaction and boost hydrogen content. $H_2O$ reactions with C and $CH_4$ may be endothermic, which lowers the operation temperature, allowing for high fuel conversion with cost-effective reactor design and construction. However, these syngas generation technologies all require air separation units (ASU) to supply concentrated oxygen and account for 40% to 50% of the overall capital and operating costs of a chemical/liquid fuel production plant.

The content of $CO_2$ and $H_2O$ in the syngas may be an important aspect for the syngas quality control. In many existing processes, excess amounts of $O_2$ and $H_2O$ may be usually introduced, which may result in promoting combustion and water gas shift reactions, respectively. A significant amount of $CO_2$ and/or $H_2O$ may exist in the syngas stream, lowering the syngas production selectivity and efficiency.

In processes such as DMR, carbon deposition and formation may occur, when the fuel may be exposed to metallic substances such as Ni and Fe in a low $CO_2$ and low $H_2O$ content environment. The metallic substance may catalyze the methane decomposition to carbon and hydrogen, where the absence of oxidizing gas, such as $CO_2$, $H_2O$ and $O_2$, prevents the deposited carbon from being gasified. The negative effects of carbon deposition are two-fold: it may reduce the fuel conversion efficiency and selectivity, and may cause catalyst deactivation.

Thus, controlling the $CO_2/H_2O$ ratio and concentration, and preventing carbon deposition may be two opposing challenges in many conventional syngas production processes. Many of these processes use excess $CO_2/H_2O$ to suppress carbon formation. Such tradeoff may result in a syngas product stream with more than 15% $CO_2$ and/or $H_2O$, requiring downstream syngas purification steps and may result in a decreased fuel to syngas production efficiency. The process described herein may minimize excess $CO_2$ and/or $H_2O$ use and production while preventing carbon formation and deposition, greatly improving the syngas production efficiency.

Described herein are chemical looping processes that have been developed for natural gas conversion to syngas. Oxides such as, but not limited to, $Fe_2O_3$, NiO, ZnO, PbO, CoO, $Cr_2O_3$, $BaSO_4$ have been considered as oxygen carriers to partially oxidize methane to CO and $H_2$. The reduced metal oxides and sulfates may be regenerated with air in a separate reactor. The chemical looping approach avoids the direct mixing between methane and air, and thus eliminates the need for an ASU and has the potential to significantly reduce syngas production costs.

However, in order to produce a low $H_2O$ and $CO_2$ content syngas (less than 10 mol % respectively) from the chemical looping system, the thermodynamic phase equilibrium of single metal oxides and/or sulfates dictates that complete reduction to metallic phase or metal sulfide may be required in the fuel reactor (reduction reactor). The complete reduction may irreversibly change the oxygen carrier structure, causing its deactivation during the redox cycles. In addition, the extensive formation of the reduced metallic phase may accelerate methane decomposition resulting in carbon formation/deposition. For example, when 70% of $Fe_2O_3$ is reduced to Fe, carbon deposition may become a dominant process. Also, the reduction extent of metal oxides and sulfates affects the CO to $H_2$ ratio, which may require a careful control of the solid circulation rate and operation condition.

The composite metal oxide may be in the form of particles, pellets, or monolith, depending on the reactor design. The pellet size may range from 300 microns to 4000 microns, which may be suitable for moving bed operation. In one embodiment, the density of the composite metal oxide may be from about 1000 to about 5000 $kg/m^3$. The relatively large pellet size and relatively high density may also assist the separation of process fines when solid fuels are used as the feedstock fuel. The composite metal oxide materials may be chemically and physically stable during the redox cycle. The synthesis procedure includes dry/wet mixing, particle/pellet formation, and sintering. Alternative techniques include sol-gel, wet impregnation, and dry-freezing.

In addition to natural gas, the feedstock fuels may be any gas, solid, and liquid fuel, or combinations thereof. Gaseous fuels include shale gas (including dry gas and wet gas), tail gas containing light hydrocarbons from downstream syngas conversion and hydroprocessing units such as Fischer-Tropsch synthesis. The composite material may be effective in converting C1-C4 hydrocarbons as well as $CO_2$ and $H_2O$ to high quality syngas from the feedstock fuels sources. In certain embodiments, the composite material may handle sulfur compound in the fuel gas without deactivation. Therefore, no fuel pretreatments, such as $CO_2$ removal and sulfur removal, may be needed. The methods described herein may also convert solid fuels such as coal, petroleum coke, and biomass, as well as liquid fuels, such as naphtha and residual oil. In one embodiment, when solid fuels are introduced with the metal oxide composite in a moving bed process, the solid fuel may be in pellet form with a size ranging from about 300 to about 4000 microns. Such operation may ease the solid fuel injection and enhance the solid-solid distribution inside the reactor bed.

In some embodiments, solar energy may be used as a heat source for the endothermic reactions of the fuel conversion in the reduction reaction. Such arrangement may directly convert $CO_2$ and $H_2O$ into syngas and other fuel forms for solar energy storage and utilization. In another embodiment, oxygen or oxygen releasing material may be introduced in the reduction reaction to increase reaction kinetics for syngas production. In yet another embodiment, the composite metal oxide materials may release oxygen for fuel conversion.

In one embodiment, a co-current flow reactor may be used for syngas production in the first step (reduction reaction). In one embodiment, a moving packed bed reactor may be used with both fuel and the composite metal oxides fed from the top and discharged from the bottom. The co-current downward flow moving bed reactor may ensure a full conversion of fuel into syngas as well as a desired composite metal oxide conversion which, may control the syngas product composition and may avoid carbon formation. The solid flow in the reduction reactor may be controlled by a non-mechanical valve system positioned at the bottom of the reactor. The reduced composite metal oxide may be then transported to the second step, an air fluidized bed reactor that oxidizes the composite metal oxide to a higher oxidation state. Alternative reactor designs for the first step include rotary kiln, riser, and downer, which may provide similar gas solid co-current flow patterns. The overall process may be auto-thermal with composite metal oxides transferring heat between the reactors.

In one embodiment, the two-step conversion (reduction and oxidation) may be conducted in a fixed bed reactor and a gas switching system for syngas production from gaseous fuel. The fixed bed may be filled with composite metal oxide pellets, particles or a monolithic bed structure. The fuel gas may be introduced to the fixed bed, where the composite metal oxide may be reduced within a certain extent and high quality syngas may be produced. When the composite metal oxide conversion reaches a determined state, the fuel gas may be switched to a preheated air stream for the composite metal oxide regeneration. In one exemplary embodiment, the fuel and air streams may be preheated and the gas switching system may be operated at high temperatures (at least about 1000° C.).

In yet another embodiment, a counter-current moving bed reactor may be used for the first step with fuel introduced from the bottom and composite metal oxide introduced from the top. A conversion profile of the composite metal oxide may be formed inside the moving bed reactor. There may be two gas outlets in the moving bed reactor, one at the top for concentrated $CO_2$ and $H_2O$ production, another in the middle of the bed where the composite metal oxide conversion may be suitable for high quality syngas production. For the second step, the reduced composite metal oxide may be reoxidized with air. In this embodiment, high quality syngas may be obtained with sequestration ready $CO_2$ stream. The yield between syngas and $CO_2$ stream may be adjusted by the process heat balance and flowrates from the two gas outlets of the moving bed reactor.

In another embodiment, a moving bed reactor may be used for simultaneous high quality syngas and high purity $CO_2$ productions. For the first step, the composite metal oxide may be introduced from the top, and the fuel may be introduced at the middle. Two gas outlets may be positioned at the top and bottom of the moving bed reactor. The gas coming out from the top may encounter higher oxidation state composite metal oxides resulting in high purity $CO_2$ and $H_2O$ production, while the gas from the bottom may be high quality syngas controlled by the reduced composite metal oxide. The reduced composite metal oxide may be reoxidized by air in another reactor for the second step. For this two-step process, high quality syngas may be obtained with sequestration ready $CO_2$ stream. The yield between syngas and $CO_2$ stream may be adjusted by the process heat balance and the fuel split ratio in the moving bed reactor.

In another embodiment, the reduced composite metal oxide from the first step may be oxidized by $H_2O$, $CO_2$ or a mixture thereof, for production of $H_2$, CO or syngas in an additional reactor. In one embodiment, the additional reactor may be a moving bed reactor with counter-current gas ($H_2O$, $CO_2$)—solid (reduced composite metal oxide) contacting pattern. The operation temperature may be from about 500° C. to about 1100° C.

Figure 2:
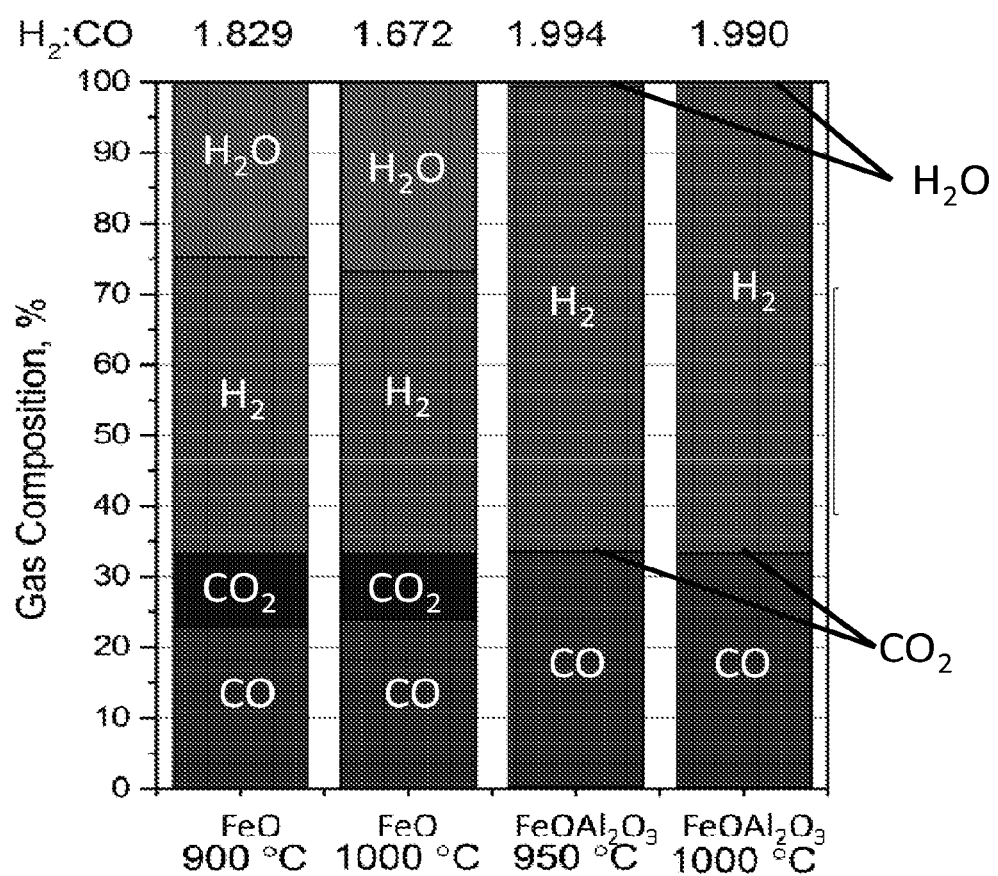
FIG. 2 is a graph comparing the equilibrium syngas composition difference between pure FeO and composite metal oxides, according to one or more embodiments shown and described herein.

The oxidation state of the single metal oxide may significantly affect the syngas composition and possibility of carbon formation. As shown in FIG. 1 and FIG. 2, for example, when FeO may be used to partially oxidize methane to syngas, a low selectivity to $CO_2$ and $H_2O$ may be obtained when the FeO to $CH_4$ ratio may be below 2. In such condition, however, metallic Fe may be formed and may catalytically decompose methane causing carbon deposition. Carbon deposition/formation may be avoided by reducing the extent of the metal oxide reduction by increasing the FeO to $CH_4$ ratio. Conversely, increasing this ratio results in an increase in $CO_2$ and $H_2O$ levels to more than 30 mol %, lowering the syngas selectivity and yield. Thus, the use of a single metal oxide material pose challenges in syngas quality control.

The subject matter of the present disclosure may be integrated with various fuel and chemical synthesis processes in light of its ability to produce flexible CO to $H_2$ ratio. Depending on the downstream application, the CO to $H_2$ ratio may be adjusted to the desired value in the first step by introducing $CO_2$ or $H_2O$ together with the fuel. The $CO_2$ and $H_2O$ may also enhance the initial conversion of methane and carbon via reforming and gasification reactions, respectively. Thus, the need for cost and energy intensive downstream processes to adjust the syngas composition may be removed or reduced to a minimal. In some embodiments, the reduced composite metal oxide may be also used for hydrogen production by steam oxidation. The hydrogen produced may be used for hydroprocessing or product upgrading. In certain embodiments, less than 20 wt % of dopants may be added to the composite to catalyze certain reactions such as methane decomposition, carbon gasification, and tar cracking. The dopants may be selected from the group consisting of at least one of Ca, Ce, Pt, Ru, Rh, La, Fe, Cu, and oxides thereof. In yet another embodiment, the composite metal oxide material may also release oxygen for fuel conversion. Binders such as bentonite and PVC material may be also used for binding purpose in the synthesis process.

The composite metal oxide material may be chemically and physically stable during multiple redox cycles. Single metal oxide materials may not be able to sustain multiple redox cycles due to changes in mechanical and crystal structure. The composite metal oxide materials may be synthesized by dispersing active metal oxide compounds in a physically stable structure, and thus may be repeatedly used in the process with little change to its reactivity and oxygen carrying capacity.

Figure 3A:
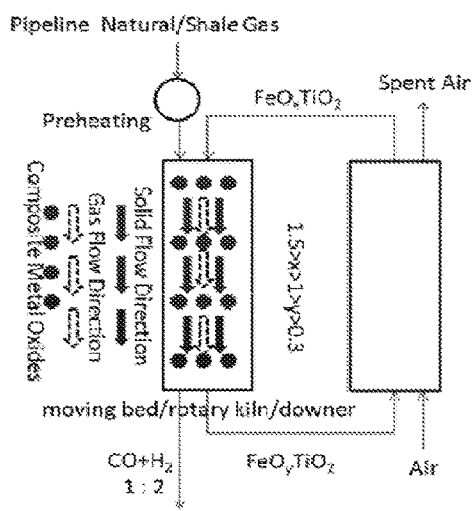
FIG. 3(a) is a schematic flow diagram of a fuel conversion system using a co-current reactor for the reduction reaction of composite metal oxide using gaseous fuel, according to one or more embodiments shown and described herein.
Figure 3B:
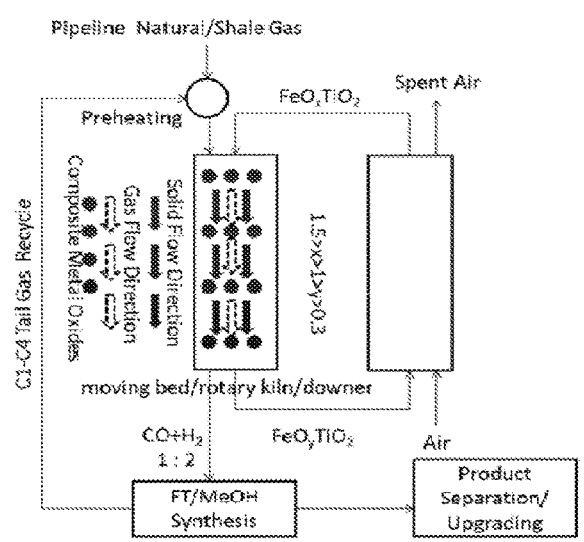
FIG. 3(b) is a schematic flow diagram of a fuel conversion system using a co-current reactor for the reduction reaction of composite metal oxide using gaseous fuel, according to one or more embodiments shown and described herein.

In other embodiments, as shown in FIG. 3(a) and FIG. 3(b), a co-current flow reactor may be used for syngas production in the first step from a natural gas or shale gas feedstock fuel. The CO to $H_2$ ratio in the syngas may be about 1:2, which may be suitable for F-T and methanol synthesis. The tail-gas of the syngas conversion step containing $C_1$-$C_4$ hydrocarbons may be recycled to the first step reactor to maximize the fuel to product yield and efficiency. The CO:$H_2$ ratio may be adjusted to other ratios by introducing minimal amount of the $CO_2$ and $H_2O$ in step 1. For example, when $CO_2$ or other carbon rich feedstocks may be introduced together with methane, the CO to $H_2$ ratio may be adjusted to 1:1, suitable for acetic acid, acetic anhydride, and/or formaldehyde synthesis. In one embodiment, a moving packed bed reactor may be used with both fuel and the said composite metal oxides fed from the top and discharged from the bottom. The co-current downward flow moving bed reactor may promote a full conversion of fuel into syngas as well as a desired composite metal oxide conversion which may control the syngas product composition and avoid carbon formation. For example, the composite metal oxide may be introduced as $FeO_x$—$TiO_2$ at the top, and may be converted to $FeO_y$—$TiO_2$ at the bottom of the reactor. In one embodiment, the operation range of $1.5>x>1>y>0.3$ may be used to increase the particle oxygen carrying capacity and control the syngas quality. Alternatives to the first step reactor designs include rotary kiln, riser, and downer, which may provide similar gas solid co-current flow pattern as the moving packed bed reactor. The reduced composite metal oxide may be then transported to the second step, an air fluidized bed reactor that oxidizes the composite metal oxide to a higher oxidation state. For example, the main reactions in the first and second steps may be:

$$2FeOTiO_2+CH_4=2FeO_{0.5}TiO_2+CO+2H_2$$

$$\Delta H=235 \text{ kJ}@1000° \text{ C.}$$

$$2FeO_{0.5}TiO_2+\tfrac{1}{2}O_2=2FeOTiO_2$$

$$\Delta H=-359 \text{ kJ}@1000° \text{ C.}$$

Still referring to FIGS. 3(a) and 3(b), the overall heat of reaction may be thus exothermic, rendering a flexible process heat balance. In one embodiment, the operation temperature may be from 500° C. to 1200° C. for the first step, and from 600° C. to 1250° C. for the second step. The fuel and oxidizing gas feedstocks for the first and second step, respectively, may be preheated up to 1000° C. to increase the fuel to syngas efficiency. The operation pressure may range from 1 to 50 bars, depending on the pressure of feedstocks as well as the requirement of the downstream syngas conversion process.

Figure 4A:
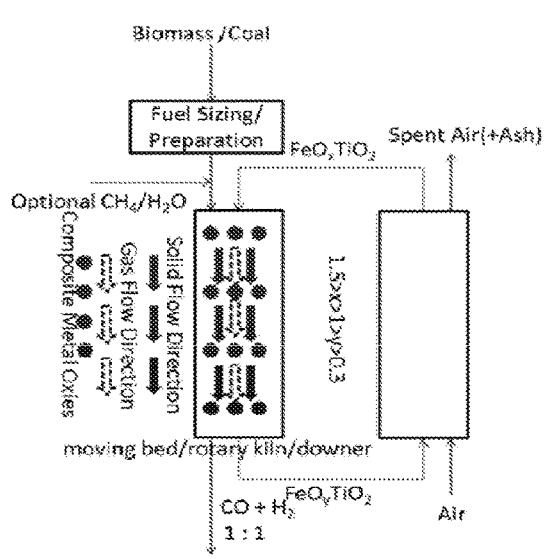
FIG. 4(a) is a schematic flow diagram of a fuel conversion system using a co-current reactor for the reduction reaction of composite metal oxide using solid fuel, according to one or more embodiments shown and described herein.
Figure 4B:
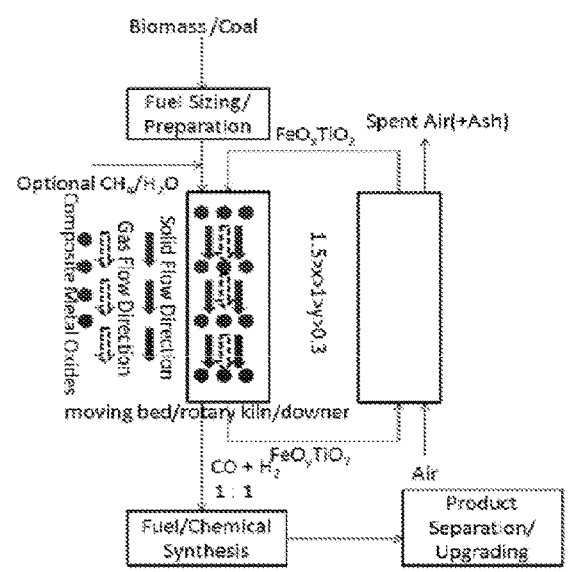
FIG. 4(b) is a schematic flow diagram of a fuel conversion system using a co-current reactor for the reduction reaction of composite metal oxide using solid fuel, according to one or more embodiments shown and described herein.

In other embodiments, as shown in FIG. 4(a) and FIG. 4(b), a co-current flow reactor may be used for syngas production from solid fuels such as biomass and/or coal. The CO to $H_2$ ratio in the syngas may be about 1:0.6 to about 1:0.8, and may depend on the composition of the feedstock fuels. Co-injection of hydrogen rich feedstocks such as $CH_4$ and $H_2O$ may adjust the CO to $H_2$ ratio to about 1:1 or about 1:2, which may be suitable for downstream chemical and fuel synthesis. In one embodiment, a moving packed bed reactor may be used with similar sized solid fuel and the said composite metal oxides fed from the top and discharged from the bottom. The co-current downward flow moving bed reactor may promote full fuel conversion into syngas as well as a desired composite metal oxide conversion which may control the syngas product composition and avoid carbon formation. For example, the composite metal oxide may be introduced at the top of the first step reactor as $FeO_xTiO_2$ and may be converted to $FeO_yTiO_2$ when it reaches the bottom. In one embodiment, the operation range of $1.5>x>1>y>0.3$ may be used to maintain a high particle oxygen carrying capacity and to control the syngas quality. The solid flow may be controlled by a non-mechanical valve system positioned at the bottom of the reactor. The reduced composite metal oxide may be then transported to the second step, an air fluidized bed reactor that oxidizes the composite metal oxide to a higher oxidation state. In one embodiment, the operating temperature may range from about 500° C. to about 1200° C. for the first step, and from about 600° C. to about 1250° C. for the second step. The fuel and oxidizing gas feedstocks for the first and second step, respectively, may be preheated up to at least about 1000° C. to increase the fuel to syngas efficiency. The operating pressure may range from about 1 bar to about 50 bars, depending on the pressure of the feedstocks as well as the requirement of the downstream syngas conversion process. Alternatives to the first step reactor designs include rotary kiln, riser, and downer, which may provide similar gas solid co-current flow pattern as the moving packed bed reactor.

Figure 5A:
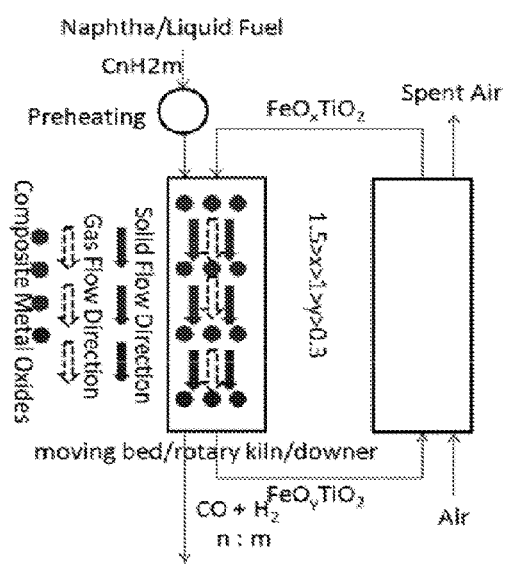
FIG. 5(a) is a schematic flow diagram of a fuel conversion system using a co-current reactor for the reduction reaction of composite metal oxide using liquid fuel, according to one or more embodiments shown and described herein.
Figure 5B:
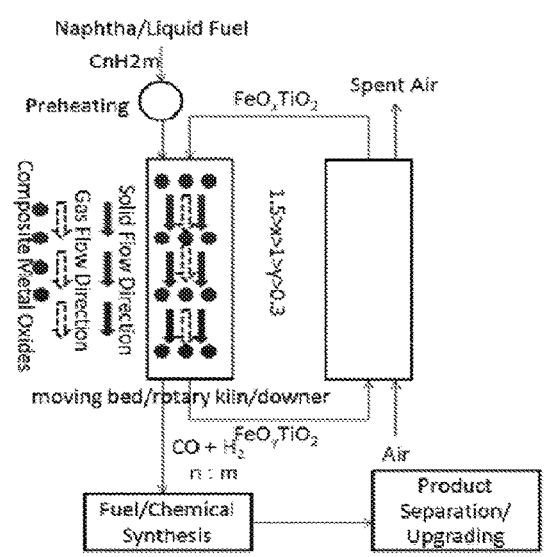
FIG. 5(b) is a schematic flow diagram of a fuel conversion system using a co-current reactor for the reduction reaction of composite metal oxide using liquid fuel, according to one or more embodiments shown and described herein.

In other embodiments, as shown in FIG. 5(a) and FIG. 5(b), a co-current flow reactor may be used for syngas production from liquid fuels such as, but not limited to, naphtha. In one embodiment, a moving packed bed reactor may be used with preheated liquid fuel and the said composite metal oxides fed from the top and discharged from the bottom. The co-current downward flow moving bed reactor may promote full fuel conversion into syngas as well as a desired composite metal oxide conversion which may control the syngas product composition and avoid carbon formation. For example, the composite metal oxide may be introduced in the first step reactor as $FeO_xTiO_2$ at the top, and may be converted to $FeO_yTiO_2$ when it reaches the bottom. In one embodiment, the operation range of $1.5>x>1>y>0.3$ may be used to maintain a high particle oxygen carrying capacity and control the syngas quality. The solid flow may be controlled by a non-mechanical valve system positioned at the bottom of the reactor. The reduced composite metal oxide may then be transported to the second step, an air fluidized bed reactor that oxidizes the composite metal oxide to a higher oxidation state. In one embodiment, the operating temperature ranges from 500° C. to 1200° C. for the first step, and from 600° C. to 1250° C. for the second step. The fuel and oxidizing gas feedstocks for the first and second step, respectively, may be preheated up to 1000° C. to increase the fuel to syngas efficiency. The operating pressure may range from 1 to 50 bars, depending on the pressure of feedstocks as well as the requirement of the downstream syngas conversion process.

Figure 6:
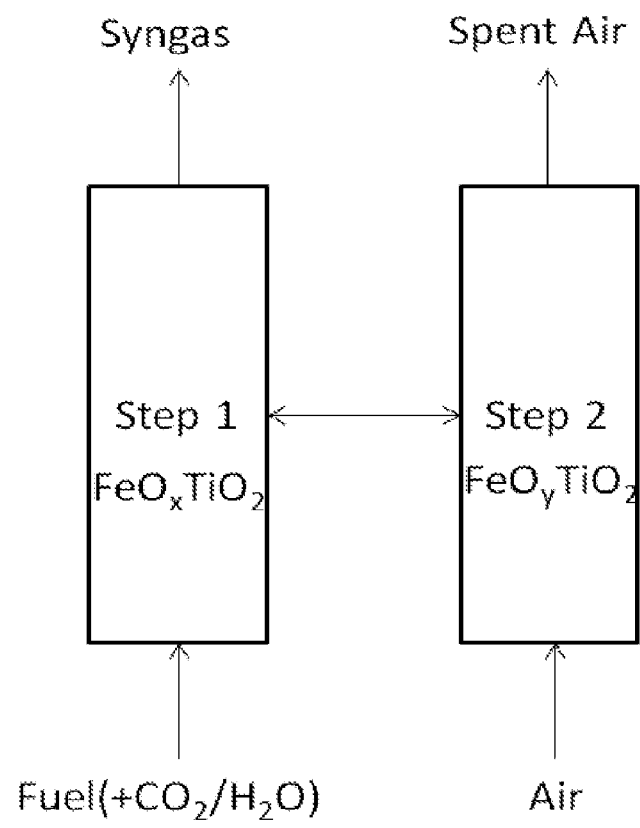
FIG. 6 is a schematic flow diagram of a fuel conversion system using a fixed bed reactor, according to one or more embodiments shown and described herein.

In another embodiment, as shown in FIG. 6, the two step conversion may be conducted in a fixed bed reactor with a gas switching system for syngas production from gaseous fuel. The fixed bed may be filled with composite pellets, particles or a monolithic bed structure. The fuel gas may be introduced to the fixed bed, where the composite metal oxide may be reduced within a certain range and high quality syngas may be produced. When the composite metal oxide conversion reaches a certain extent of reduction, the fuel gas may be switched to preheated air for the composite metal oxide regeneration. For example, the composite metal oxide may be reduced in the first step reactor from $FeO_xTiO_2$ to $FeO_yTiO_2$ before switching the gas feed to the second step. In one embodiment, the operating range of $1>x>y>0.3$ may be used to control the syngas quality. In one embodiment, the fuel and air streams may be preheated and the gas switching system may be operated at high temperatures. In one embodiment, the operating temperature may range from about 500° C. to about 1200° C. for the first step, and from about 600° C. to about 1250° C. for the second step. The fuel and oxidizing gas feedstocks for the first and second step, respectively, may be preheated up to at least about 1000° C. to increase the fuel to syngas efficiency. The operating pressure may range from about 1 bar to about 50 bars, depending on the pressure of the feedstocks as well as the requirement of the downstream syngas conversion process.

Figure 7:
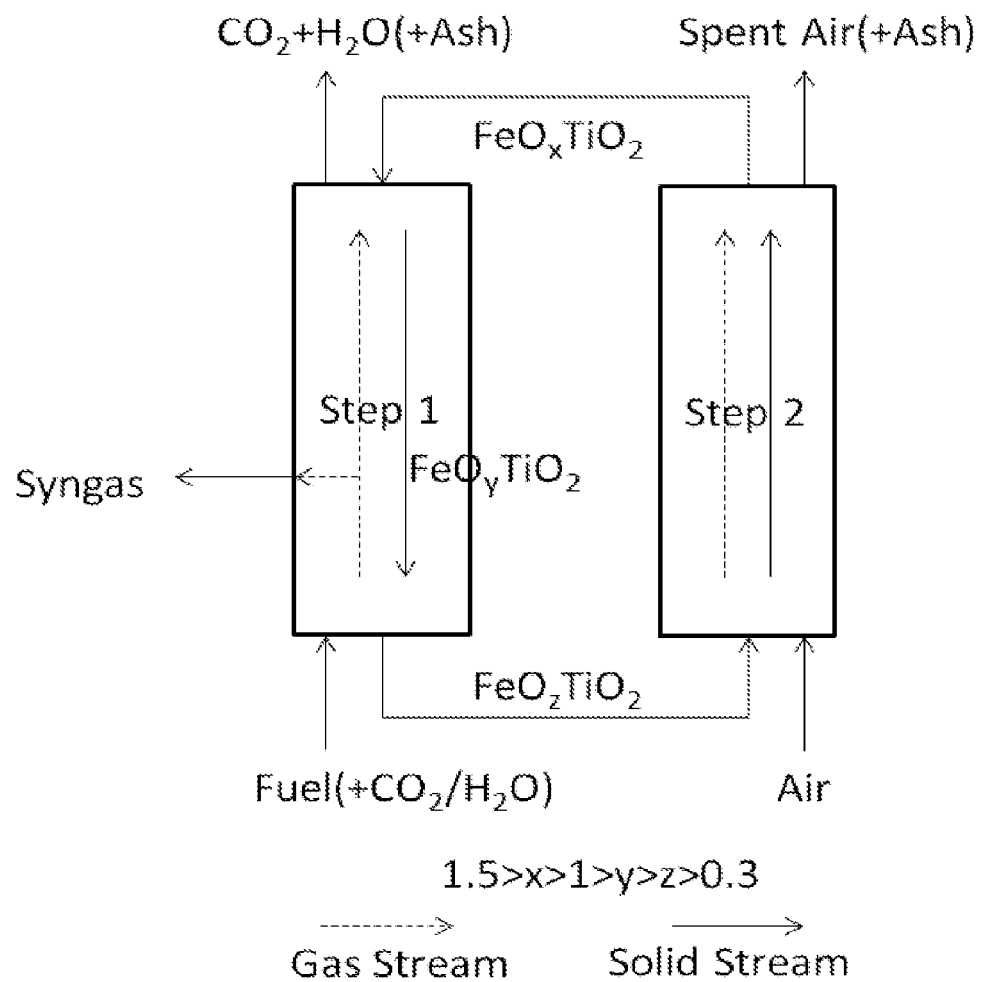
FIG. 7 is a schematic flow diagram of a fuel conversion system using a counter-current moving bed reactor with syngas produced from the middle and concentrated $CO_2$ stream from the top in the reduction reaction of composite metal oxide, according to one or more embodiments shown and described herein.

In another embodiment, as shown in FIG. 7, a counter-current moving bed reactor may be used for the first step with fuel introduced from the bottom and composite metal oxide introduced from the top. This gas-solid contact design may form a conversion profile of the composite metal oxide along the height of the moving bed reactor. Two gas outlets may be placed on the moving bed reactor, one at top for concentrated $CO_2$ and $H_2O$ production, and the other at or near the middle where the composite metal oxide conversion may be suitable for high quality syngas production. In the second step, the reduced composite metal oxide may be reoxidized with air. For this two-step process, high quality syngas may be obtained in conjunction with a high purity/sequestration ready $CO_2$ stream. For example, the composite metal oxide may be introduced in the first step reactor as $FeO_xTiO_2$ at the top, and may be converted to $FeO_yTiO_2$ when it reaches the middle, and may be converted to $FeO_zTiO_2$ when it reaches the bottom. In one embodiment, the operation range of $1.5>x>1>y>z>0.3$ may be used to maintain a high particle oxygen carrying capacity and control the syngas quality. The yield between syngas and $CO_2$ stream may be adjusted by the process heat balance and flowrates from the two gas outlets of the moving bed reactor. The operating temperature may range from about 500° C. to about 1200° C. for the first step, and from about 600° C. to about 1250° C. for the second step. The fuel and oxidizing gas feedstocks for the first and second step, respectively, may be preheated up to at least about 1000° C. to increase the fuel to syngas efficiency. The operating pressure may range from about 1 bar to about 50 bars, depending on the pressure of the feedstocks as well as the requirement of the downstream syngas conversion process.

Figure 8:
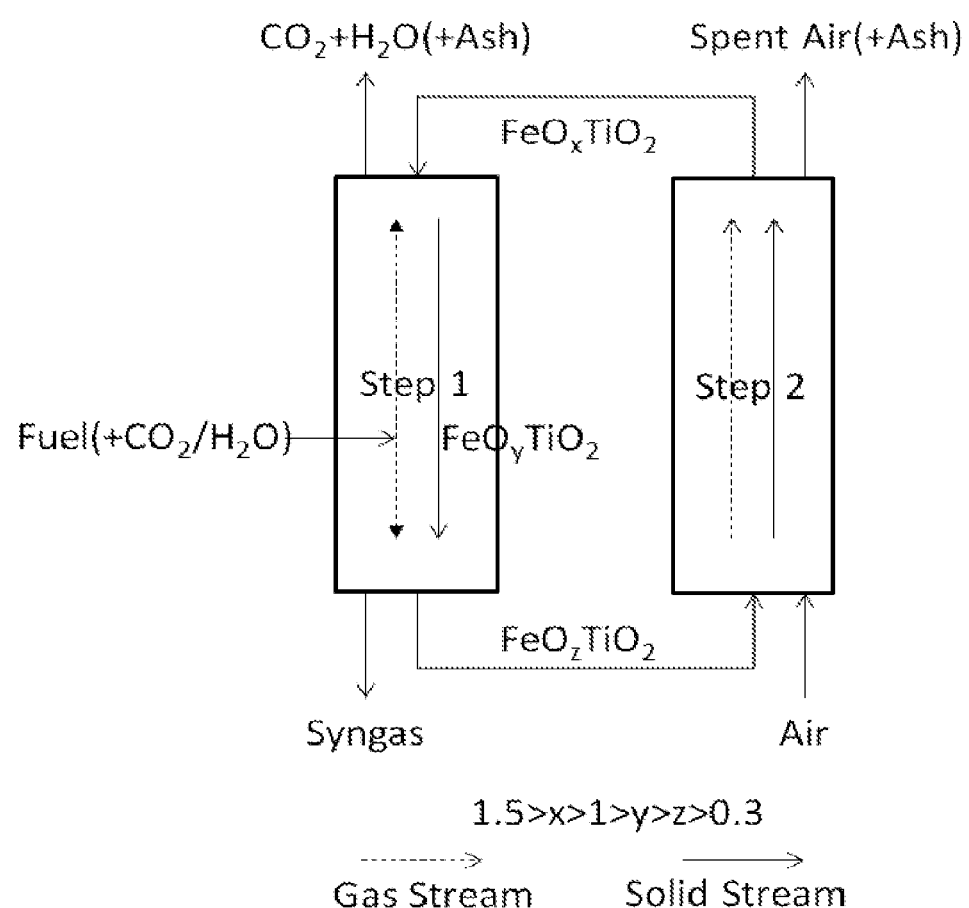
FIG. 8 is a schematic flow diagram of a fuel conversion system using a moving bed reactor with fuel introduced in the middle and syngas produced from the bottom and concentrated $CO_2$ stream from the top in the reduction (endothermic) reaction of composite metal oxide, according to one or more embodiments shown and described herein.
Figure 9:
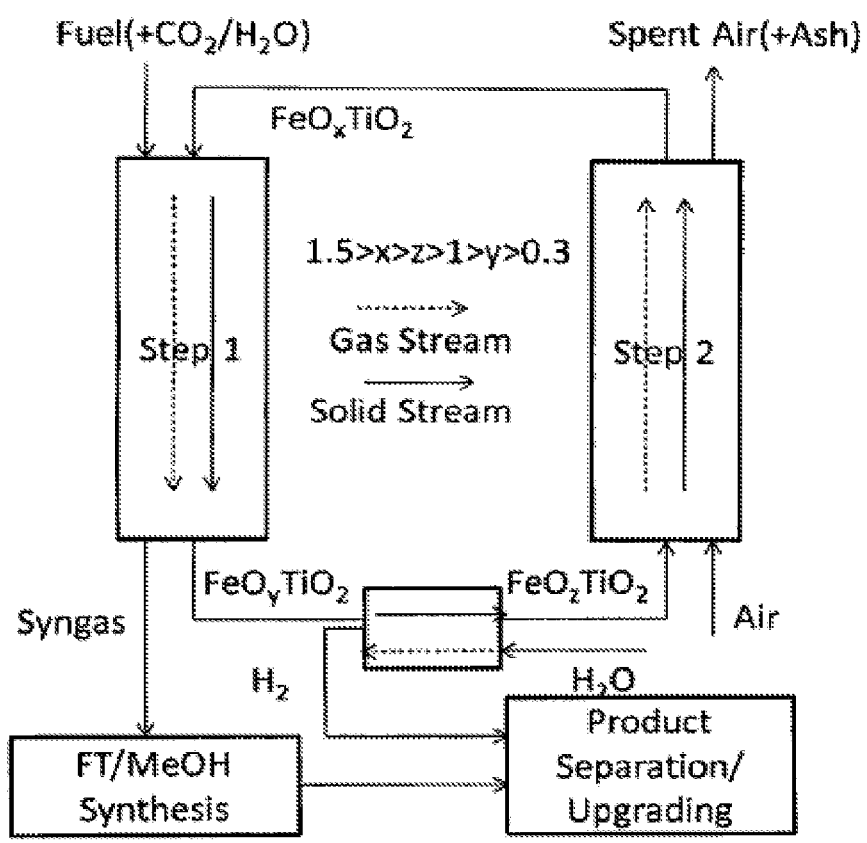
FIG. 9 is a schematic flow diagram of a fuel conversion system with additional hydrogen production from steam in a separate counter-current moving bed reactor, according to one or more embodiments shown and described herein.

In another embodiment, as shown in FIG. 8, a moving bed reactor may be used for full fuel conversion to high quality syngas and high purity $CO_2$ co-production. The composite metal oxide may be introduced from the top, and the fuel may be introduced at or near the middle of the reactor. Two gas outlets may be positioned at the top and bottom of the moving bed reactor. The gas coming out from the top may encounter higher oxidation state composite metal oxides resulting in high purity $CO_2$ and $H_2O$ production, while the gas from the bottom may be high quality syngas controlled by the reduced composite metal oxide. For the second step, the reduced composite metal oxide may be reoxidized with air. For this two-step process, high quality syngas may be obtained in conjunction with a high purity/sequestration ready $CO_2$ stream. In one embodiment, the operation range of $1.5>x>1>y>z>0.3$ may be used to maintain a high particle oxygen carrying capacity and control the syngas quality. The yield between syngas and $CO_2$ stream may be adjusted by the process heat balance and the fuel split ratio in the moving bed reactor. The operating temperature may range from about 500° C. to about 1200° C. for the first step, and from about 600° C. to about 1250° C. for the second step. The fuel and oxidizing gas feedstocks for the first and second step, respectively, may be preheated up to at least about 1000° C. to increase the fuel to syngas efficiency. The operating pressure may range from about 1 bar to about 50 bars, depending on the pressure of the feedstocks as well as the requirement of the downstream syngas conversion process. In certain embodiments, as shown in FIG. 9, the reduced composite metal oxide may be also used for hydrogen production by steam oxidation or syngas production using a mixture of $CO_2$ and $H_2O$. The hydrogen produced may be used for hydroprocessing or product upgrading.

Figure 10:
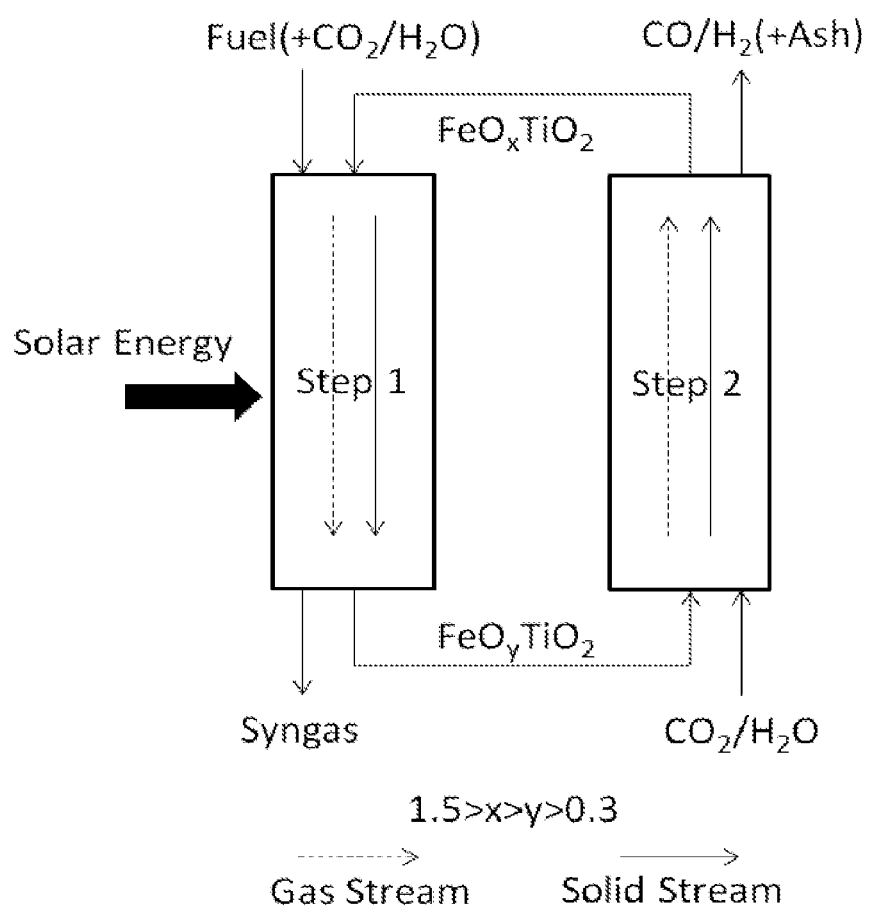
FIG. 10 is a schematic flow diagram of a fuel conversion system using solar energy to provide the heat of reaction in the two-step conversion scheme, according to one or more embodiments shown and described herein.

In another embodiment, as shown in FIG. 10, the reduced composite metal oxide from the first step may be used for hydrogen production by steam oxidation or for syngas production using a mixture of $H_2O$, $CO_2$. In one embodiment, the additional reactor may be a moving bed reactor with countercurrent gas solid contacting pattern. The operation temperature may be from about 500° C. to about 1100° C. and the heat may be supplied directly from an external heat source such as a solar energy collecting system.

Figure 11:
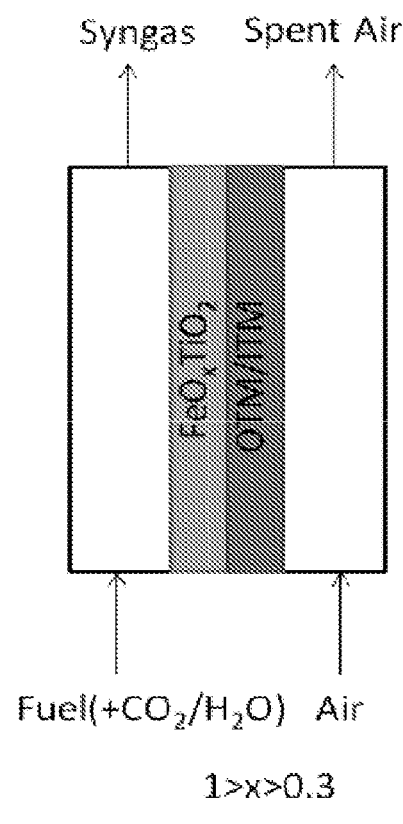
FIG. 11 is a schematic flow diagram of a fuel conversion system using a OTM/ITM based membrane reactor with the composite metal oxide material at fuel side for syngas production, according to one or more embodiments shown and described herein.

In yet another embodiment, as shown in FIG. 11, the composite metal oxide material may be coated on the fuel side of a membrane system, such as an OTM/ITM based membrane system for syngas production. Here, the composite material may be stabilized with an x value between 0.3 and 1 to control the syngas quality.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

In another embodiment, the fuel conversion system may be designed in compact, modular, mobile mode and used for offshore and remote well applications.

EXAMPLES

The various embodiments of systems and methods for converting fuel will be further clarified by the following examples. The examples are illustrative in nature, and should not be understood to limit the subject matter of the present disclosure.

Example 1

A fixed bed experiment was conducted to study the methane to syngas reaction. The lower section of the reactor was filled with 23.1 g $FeO$—$TiO_2$ particles, and the upper section was filled with 8.3 g $Fe_2O_3$—$TiO_2$ particles. When the temperature of the reactor reached 990° C., 50 mL/min $CH_4$ and 50 mL/min $N_2$ was injected into the reactor by digital mass controllers. The outlet gas composition was analyzed using a CAI gas analyzer as well as a gas chromatography. The gas concentration at the outlet reached a quasi-steady state in half an hour with methane conversion >95%, $CO:CO_2$ ratio around 10, $CO:H_2$ ratio around 1:2.

Example 2

Figure 12:
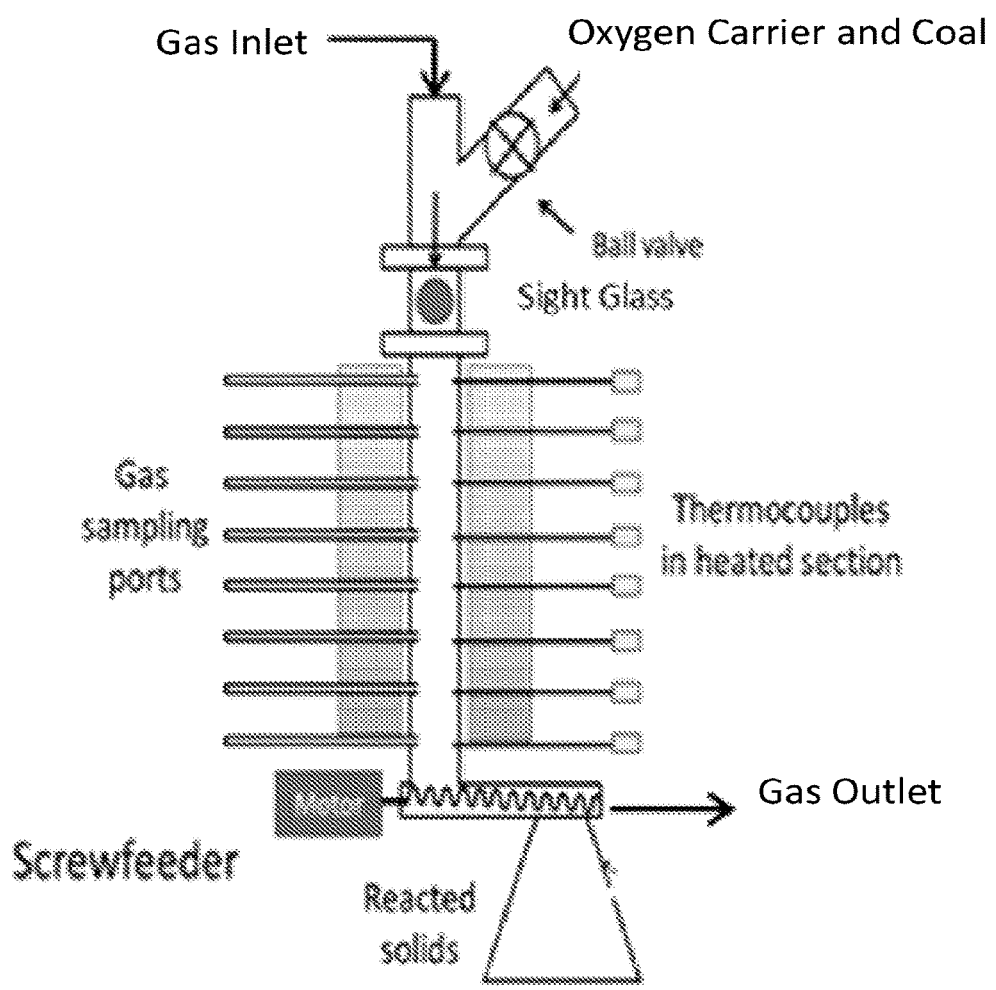
FIG. 12 is a schematic diagram of the co-current moving bed experimental apparatus.
Figure 13:
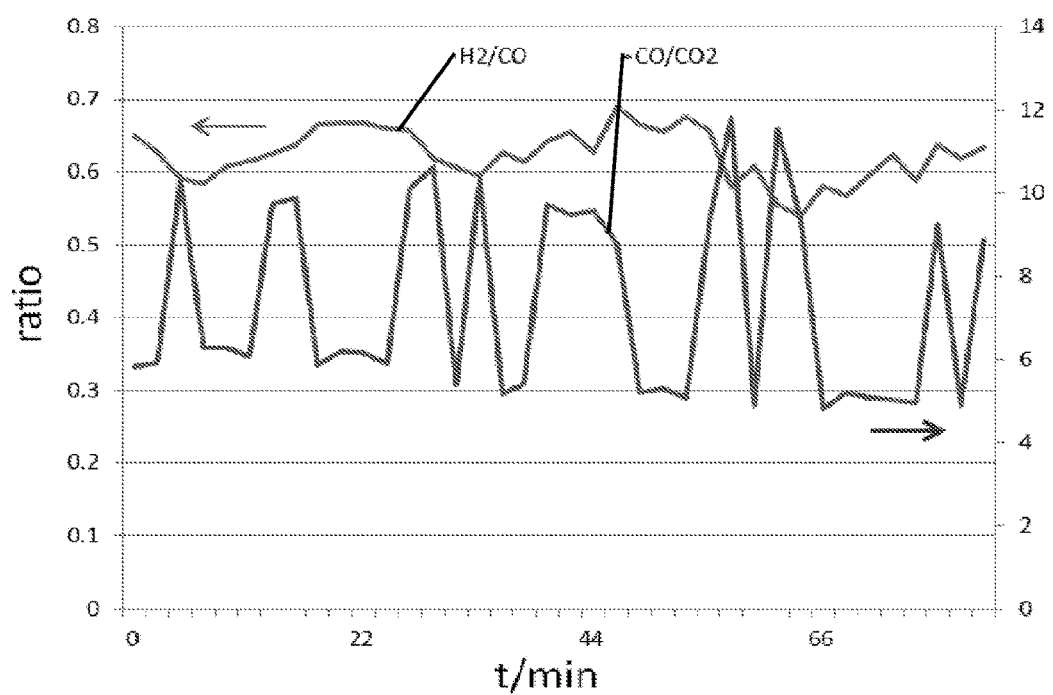
FIG. 13 is a graph illustrating $CO/CO_2$ and $H_2/CO$ ratios as a function of time for co-current moving bed experimental setup using coal as the feedstock fuel, according to one or more embodiments shown and described herein.
Figure 14:
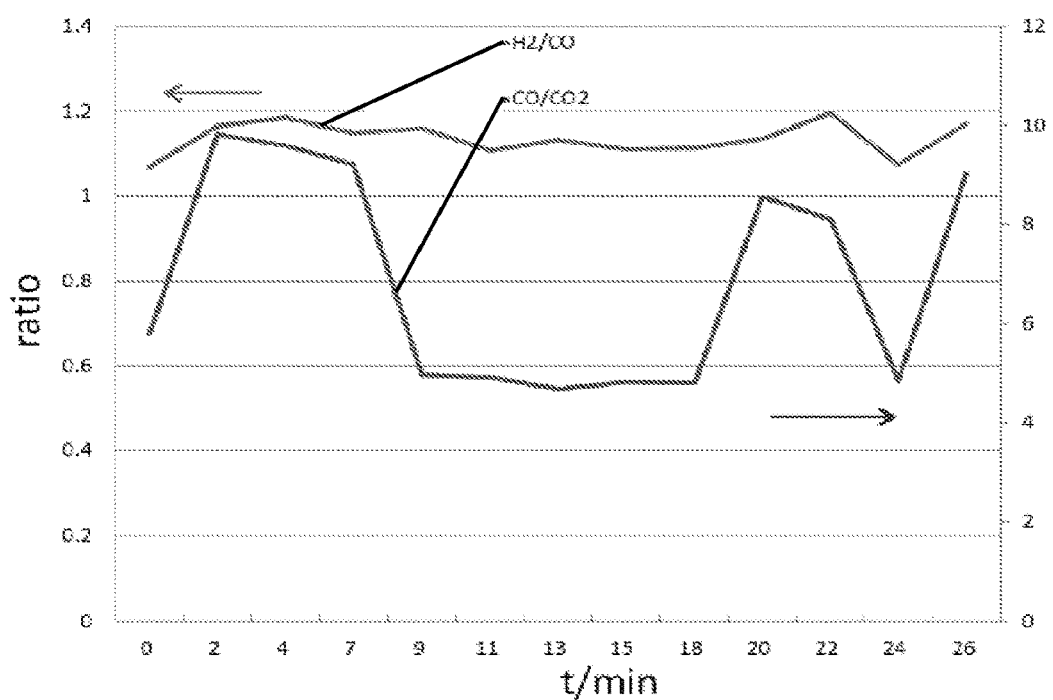
FIG. 14 is a graph illustrating $CO/CO_2$ and $H_2/CO$ ratios as a function of time for a co-current moving bed experimental setup using both coal and methane as feedstock, according to one or more embodiments shown and described herein.

A moving bed reactor test apparatus was constructed, as shown in FIG. 12, and experiments were conducted to study the solid feedstock to syngas reaction using Powder River Basin (PRB) coal as prototype coal. The PRB coal tested has about 25% moisture and the corresponding molecular formula may be $CH_{0.8}O_{0.2}$ on a dry basis. The coal powder was mixed with particles at the mass ratio of 1:5 and then fed into the moving bed system from the top in a batch mode. The solid flowrate was controlled to be 20 g/min by the screw feeder at the bottom. The temperature was controlled by the external heating to be 1030° C. At the steady state, the coal conversion is over 90%, $H_2/CO$ ratio fluctuated between 0.5-0.7 and $CO/CO_2$ ratio fluctuated between 5-12, as shown in FIG. 13, respectively. The fluctuation is due to the batch feeding mode of the solid material. Furthermore, $CH_4$ was also co-injected to adjust the $H_2/CO$ ratio. The co-injection of $CH_4$ (870 ml/min, coal 2.7 g/min, particles 20 g/min) could give adjusted the $CO/H_2$ ratio effectively around 1.1 with $CO/CO_2$ ratio maintained high, as shown in FIG. 14.

Example 3

A moving bed reactor test was conducted to study the solid feedstock conversion to syngas using biomass. The corresponding molecular formula was $CH_{1.4}O_{0.6}$. The biomass material was mixed with particles at a mass ratio of 1:3 and then injected into the moving bed system from the top. The solid fuel and composite particles followed a co-current contacting mode. The composite particle flowrate was controlled to 20 g/min using the screw feeder at the bottom. The temperature was controlled to 1040° C. using the external heaters. At steady state operation, the biomass conversion was over 95% with $CO:CO_2$ ratio around 10 and $CO:H_2$ ratio around 1:0.8. In this case, the carbon monoxide and hydrogen concentration in the high quality syngas from the syngas production reactor was higher than 91 mol %. Additionally, $CH_4$ was co-injected to adjust the $CO:H_2$ ratio. The co-injection of $CH_4$ (540 ml/min, biomass 5 g/min, particles 26 g/min) gave an almost complete fuel conversion (95%) with $CO:H_2$ ratio about 1:1. Given longer fuel residence time, a 100% fuel conversion may be achieved.

Example 4

Figure 15:
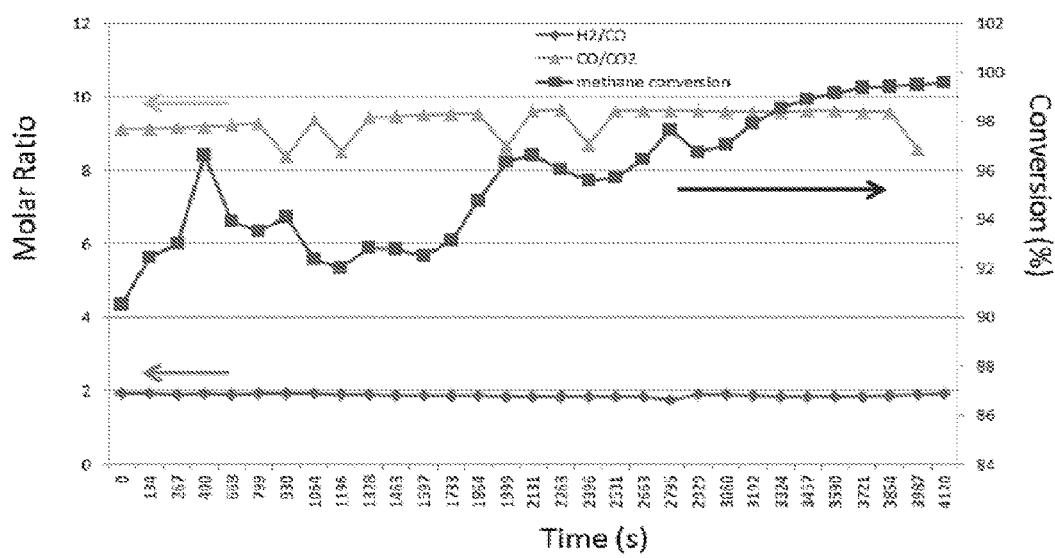
FIG. 15 is a graph illustrating co-current moving bed experimental data using methane as feedstock, according to one or more embodiments shown and described herein.

A moving bed reactor test was conducted to study the gas feedstock to syngas reaction using methane as a feedstock. FIG. 15 shows a graph illustrating the co-current moving bed experimental data using methane as feedstock.

The invention claimed is:

1. A method for converting carbonaceous fuel into syngas, the method comprising:
   feeding composite metal oxides and the carbonaceous fuel into a reduction reactor having a top and a bottom, wherein the carbonaceous fuel and the composite metal oxides are fed into the top of the reduction reactor, whereupon the composite metal oxides form a packed bed and the composite metal oxides and the carbonaceous fuel flow downward through the reactor in a co-current flow pattern relative to one another;
   reducing the composite metal oxides with the carbonaceous fuel in the reduction reactor to form syngas and reduced composite metal oxides;
   removing the syngas and the reduced composite metal oxides from the bottom of the reduction reactor wherein the syngas comprises hydrogen and carbon monoxide;
   transporting the reduced composite metal oxides to an oxidation reactor;
   regenerating the composite metal oxides by oxidizing the reduced composite metal oxides with an oxidizing reactant in the oxidation reactor; and
   recycling the regenerated composite metal oxides to the reduction reactor for subsequent reduction reactions to produce syngas in the reduction reactor;
   wherein the composite metal oxides comprise iron, titanium and oxygen and the reduced metal oxides comprise $FeO \cdot TiO_2$, or wherein the composite metal oxides comprise iron aluminum and oxygen and the reduced metal oxides comprise $FeO \cdot Al_2O_3$.

2. The method of claim 1, wherein the oxidizing reactant comprises air, oxygen, steam, carbon dioxide, or any combination thereof.

3. The method of claim 1, wherein a ratio of hydrogen to carbon monoxide can be controlled.

4. The method of claim 1, wherein the syngas comprises a stoichiometric ratio of carbon monoxide to hydrogen of about 1:2.

5. The method of claim 1, wherein the carbonaceous fuel is co-injected with a carbon-rich or hydrogen-rich reactant to change a carbon monoxide to hydrogen ratio of the syngas.

6. The method of claim 1, wherein oxygen or oxygen releasing material is introduced into the reduction reactor to increase reaction kinetics for syngas production.

7. The method of claim 1, wherein the reducing of the composite metal oxides occurs at a temperature in the range of between about 500° C. and about 1200° C.

8. The method of claim 1, wherein the syngas comprises at least about 85 mol % carbon monoxide and hydrogen.

9. The method of claim 1, wherein the syngas comprises carbon dioxide in an amount that is less than about 10 mol % of the syngas, and steam in an amount that is less than about 10 mol % of the syngas.

10. The method of claim 1, wherein the composite metal oxides further comprises a dopant/promoter comprising Ca, Ce, Pt, Ru, Rh, La, Fe, Cu, oxides thereof, or any combination thereof.

* * * * *